(12) United States Patent
Srinivasan et al.

(10) Patent No.: US 10,986,606 B2
(45) Date of Patent: *Apr. 20, 2021

(54) METHODS AND APPARATUS FOR USING RECEIVED SIGNAL STRENGTH INFORMATION IN A WIRELESS SYSTEM

(71) Applicant: Mist Systems, Inc., Cupertino, CA (US)

(72) Inventors: Nagarjun Srinivasan, Sunnyvale, CA (US); Neal Dante Castagnoli, Las Vegas, NV (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/919,762

(22) Filed: Jul. 2, 2020

(65) Prior Publication Data

US 2020/0337017 A1 Oct. 22, 2020

Related U.S. Application Data

(63) Continuation of application No. 16/147,327, filed on Sep. 28, 2018, now Pat. No. 10,764,858.
(Continued)

(51) Int. Cl.
*H04W 64/00* (2009.01)
*H04W 4/02* (2018.01)
(Continued)

(52) U.S. Cl.
CPC .......... *H04W 64/003* (2013.01); *G06N 20/00* (2019.01); *H04B 17/318* (2015.01); *H04W 4/027* (2013.01)

(58) Field of Classification Search
CPC . H04W 64/003; H04W 4/027; H04W 64/006; G06N 20/00; H04B 17/318; H04B 17/27
See application file for complete search history.

(56) References Cited

U.S. PATENT DOCUMENTS 8,442,447 B2 5/2013 Veluppillai et al.
9,654,481 B1 5/2017 Ho
(Continued)

FOREIGN PATENT DOCUMENTS

WO WO-2020018678 A1 1/2020

OTHER PUBLICATIONS

"U.S. Appl. No. 16/147,327, Advisory Action dated Mar. 26, 2020", 2 pgs.
(Continued)

*Primary Examiner* — Yuwen Pan
*Assistant Examiner* — Hung K Du
(74) *Attorney, Agent, or Firm* — Schwegman Lundberg & Woessner, P.A.

(57) ABSTRACT

Disclosed are methods and systems for estimating a location of a wireless device. In some embodiments, received signal strength indication (RSSI) values of signals from a first wireless device are determined. A rate of motion of the first wireless device is then determined based on a rate at which the RSSI values vary with time. A machine learning model is conditionally updated based on the determined rate of motion, and path loss parameters are then derived from the machine learning model. The path loss parameters are used to estimate the location of the first wireless device.

20 Claims, 20 Drawing Sheets

Related U.S. Application Data

(60) Provisional application No. 62/699,613, filed on Jul. 17, 2018.

(51) Int. Cl.
  *G06N 20/00* (2019.01)
  *H04B 17/318* (2015.01)
  *H04B 17/27* (2015.01)

(56) References Cited

U.S. PATENT DOCUMENTS

| | | | |
|---|---|---|---|
| 10,764,858 B2* | 9/2020 | Srinivasan | G06N 20/00 |
| 2015/0156647 A1 | 6/2015 | Braun et al. | |
| 2016/0323717 A1* | 11/2016 | Friday | H04B 17/318 |
| 2016/0338002 A1 | 11/2016 | Yiu et al. | |
| 2016/0360438 A1* | 12/2016 | Yiu | H04W 24/10 |
| 2018/0077533 A1 | 3/2018 | Pandharipande et al. | |
| 2018/0103408 A1* | 4/2018 | Amini | H04W 4/70 |
| 2018/0192297 A1* | 7/2018 | Chadaga | H04L 5/005 |
| 2019/0268721 A1* | 8/2019 | Tellado | G06N 20/00 |
| 2020/0029295 A1 | 1/2020 | Srinivasan | |

OTHER PUBLICATIONS

"U.S. Appl. No. 16/147,327, Final Office Action dated Dec. 13, 2019", 11 pgs.

"U.S. Appl. No. 16/147,327, Non Final Office Action dated May 30, 2019", 14 pgs.

"U.S. Appl. No. 16/147,327, Notice of Allowance dated May 18, 2020", 26 pgs.

"U.S. Appl. No. 16/147,327, Response filed Mar. 13, 2020 to Final Office Action dated Dec. 13, 2019", 15 pgs.

"U.S. Appl. No. 16/147,327, Response filed Apr. 2, 2020 to Advisory Action dated Mar. 26, 2020", 15 pgs.

"U.S. Appl. No. 16/147,327, Response filed Aug. 29, 2019 to Non Final Office Action dated May 30, 2019", 12 pgs.

"International Application Serial No. PCT/US2019/042223, International Search Report dated Oct. 18, 2019", 5 pgs.

"International Application Serial No. PCT/US2019/042223, Written Opinion dated Oct. 18, 2019", 10 pgs.

Xiuyuan, Zheng, et al., "Adaptive device-free passive localization coping with dynamic target speed", Infocom, 2013 Proceedings IEEE, IEEE, XP032440779, (Apr. 14, 2013), 485-489.

* cited by examiner

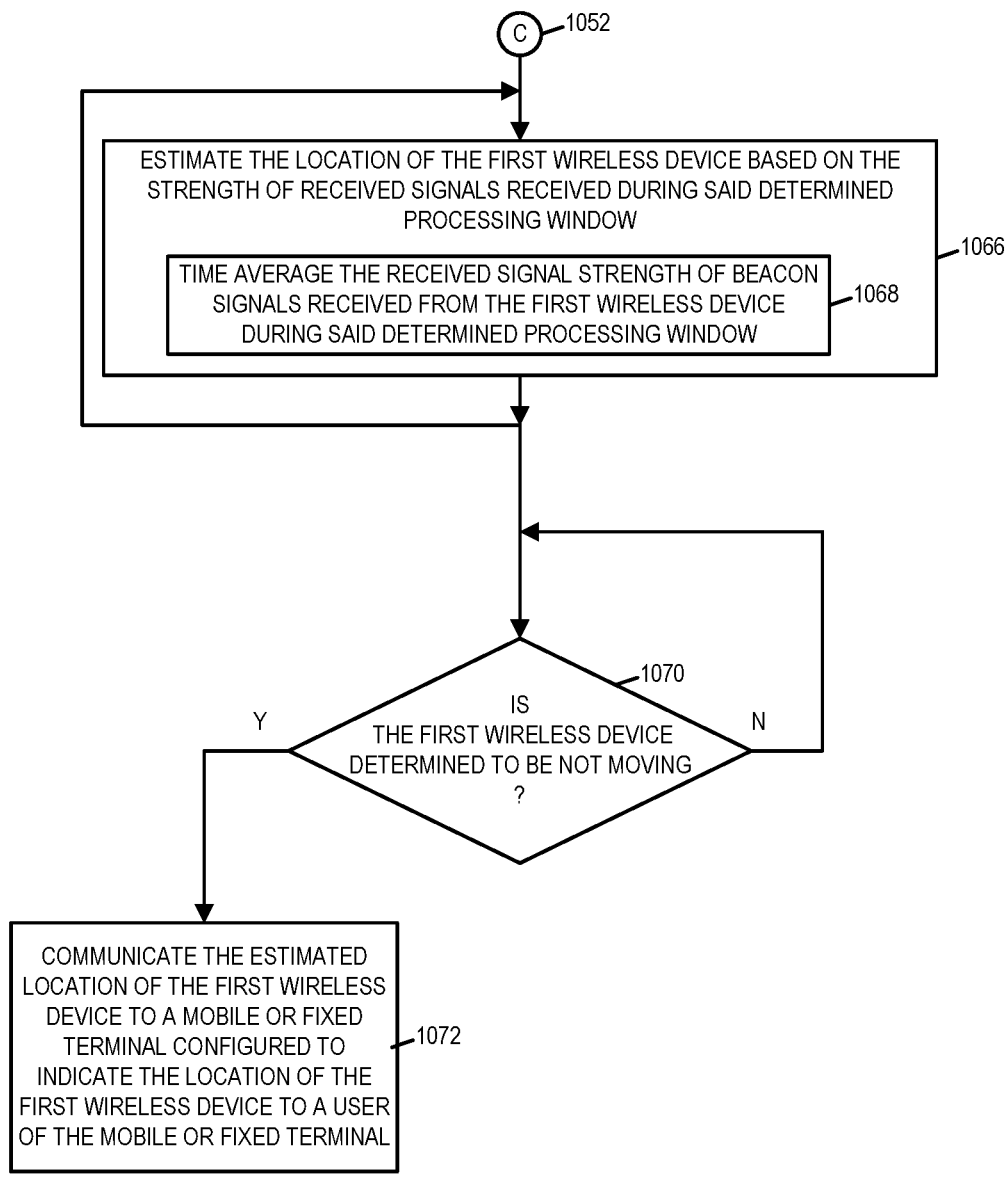
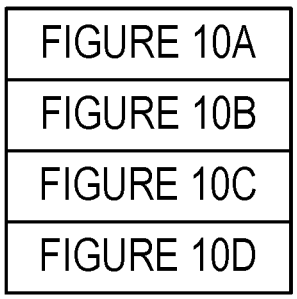
FIGURE 10D
FIGURE 10

METHODS AND APPARATUS FOR USING RECEIVED SIGNAL STRENGTH INFORMATION IN A WIRELESS SYSTEM

RELATED APPLICATIONS

This application is a continuation of U.S. patent application Ser. No. 16/147,327, filed Sep. 28, 2018 and entitled "Methods and Apparatus for Using Signal Strength Information in a Wireless System," which claims priority to U.S. Provisional Application No. 62/699,613 filed on Jul. 17, 2018. The contents of these prior applications are considered part of this application, and are hereby incorporated by reference in their entirety.

FIELD

The present application relates to method and apparatus for receiving signals, processing and/or using information about received signals, e.g., to make location determinations and/or other determinations.

BACKGROUND

Various approaches to determining device location and/or speed of motion involve the use of signal strength measurements. In some known systems access points (APs), also sometimes referred to as base stations, transmit known radio signals, e.g., beacon and/or pilot signals at a known transmit power level. A device, e.g., a user equipment device (UE) in an area where the APs transmit can measure the power of the received signals, which were transmitted at a known power level from a known location and transmitter. The power level of signals received from APs can then be used by the UE to determine its location and/or the received signal strength information can be reported to another device for use in determining the location of the UE.

Such an approach relies on the ability of UE devices to receive signals and use the received signal strength information and/or report the received signal strength information to another device for location determination purposes.

Low cost beacon transmitters which transmit a known signal at a known power level are becoming more common. Such devices normally don't include a receiver and rather than receiving and reporting the strength of a beacon or other signal transmitted by an AP simply transmit a known signal which can be used to identify the device transmitting the signal.

Various attempts to determine the location of low cost beacon transmitters and the use location information that can be generated from the receipt of signals transmitted by such devices have been made.

While the measurement of signals received from devices transmitting beacons at a known power level for location determination might seem straight forward, device movement and/or changes in an environment may, and often do, affect the strength of signals received from such devices. Since inexpensive beacon transmitter devices normally only transmit a beacon or other fixed signal and do not transmit information expressly indicating whether or not they are moving, motion information is normally not readily available to a device receiving signals from a beacon transmitter device.

In view of the above it should be appreciated that there is a need for methods and/or apparatus for determining when a device transmitting beacon or other signals is in motion, processing signals received from devices, taking into consideration whether or not they are in motion, and/or taking into consideration motion information when making a decision when or how location information generated from signals received from a device should be used.

SUMMARY OF THE INVENTION

Various features and embodiments are directed to methods and apparatus for processing and using signals transmitted by a device, e.g., a low cost beacon transmitter device, sometimes referred to as a tag, to facilitate making a location determination with regard to the transmitting device and/or making a decision of when or how to use location information generated based on received signals from a device. While the methods and apparatus are well suited for use with low cost tag devices which normally do not include receivers, the methods can be used with a wide variety of devices including cell phones and/or other more advanced devices which transmit signals, e.g., one or more beacon signals, at known power levels.

In some embodiments a tag emits a radio beacon signal at a predetermined transmit power level. The receivers at access points (APs) within the coverage area of the tag receive the beacon signal from the tag and determine its received signal strength (RSS). The RSS information, also sometimes referred to as a received signal strength indicator (RSSI), is then either processed in the AP to make a location determination or, in at least some embodiments, is communicated to a location determination device, e.g., a location engine, which uses RSS information from multiple APs to determine the location of a device or devices from which signals were received. While an AP or another node, e.g., a network node including a location engine, may make the location determination, in some embodiments, the device making the location determination uses not only information about signals it receives but also RSS information provided by other APs. In such an embodiment the location engine will receive signal strength information from multiple APs. The location of the AP may be and sometimes is in a node in the core of the network or an AP located at the end of the network Thus it should be appreciated that the location of the location engine, which determines device location, could be in an AP or somewhere else, e.g., at a central location outside a customer premises where the APs are located. Thus in at least some embodiments, RSSIs from a tag are reported by one or more APs to a location, e.g., a central location or the location of an AP, where the location of the tag and the state of motion and/or speed of the tag are calculated, e.g., based on received signal strength information. The state of motion is sometimes treated as a binary speed determination with a first, e.g., very low or no speed, being interpreted as a stationary or no motion state and a second, e.g., higher speed above a motion speed threshold level, being interpreted as indicating a state of motion. The location determination can, and in some embodiments does, take into consideration the location of the APs reporting the received signal strength of signals received from an individual tag.

In accordance with some features the processing performed on the received signal strength measurements is based on whether or not the device from which the signals are received is in motion. Motion and/or the rate of motion is estimated based on variations in received signal strength, e.g., variations in the received signal strength reported by an individual AP over time. In some embodiments a rate of change in received signal strength for signals from a tag below a first threshold is interpreted as indicating that the device is stationary. Higher rates of variation in the received signal strength are interpreted as indicating motion, and the rate of motion may be, and sometimes is, based on the rate of change in the received signal strength for signals received at an AP from a tag.

Whether or not a device, e.g., tag, is determined to be in motion is taken into consideration in some embodiments as part of deciding how to process received signal strength information corresponding to an individual tag and/or when or how location determinations should be made or used.

In at least some embodiments when a device is determined not to be in motion, e.g., stationary, a processing window for RSS measurements is used which is larger than when a device is determined to be in motion. For example when a device is determined to be stationary, received signal strength samples may be averaged over a first number of samples corresponding to a first time window. When a device is determined to be moving or moving at a particular rate, a processing window for signal strength measurements, e.g., samples, of a duration corresponding to the determined rate of motion will be used. The number of measurements processed in a window when motion is detected will normally be smaller than when a device is determined to be stationary. This reflects that fact that in the case of motion, particularly where there is a high rate of change in RSS measurements, more recent data may be more reliable than older data, and that by doing a long time window the current effect of motion may not be as reliably reflected in a location estimate if a large time window were used, e.g., particularly if the device was moving at different rates or stationary during a portion of the larger time window.

Thus in some embodiments a rate of motion is estimated based on RSS information corresponding to a transmitter device, e.g., tag. The motion information is used for controlling a processing time window in some embodiments and/or how often location determinations are made. In the case of a stationary object, reliability is achieved by using received signal measurements from a longer time window than in cases where motion is occurring.

In some embodiments the determination of whether or not a device is in motion or not, e.g., has a zero rate of motion or some non-zero rate of motion, is used to determine how location information should be used. For example, in one restaurant application location information, used to determine where to deliver an order, is communicated to a server after the tag, whose location is being determined, has ceased moving and/or has ceased moving and stopped at a location corresponding to a table. In such embodiments, not only is location reliability improved by taking into consideration whether a device, e.g., a tag transmitting a beacon signal is moving, but resources such as server time can be efficiently used by taking into consideration whether or not a tag is moving, avoiding attempted delivery of goods such as food while the customer is still moving and/or has not yet reached a table where the food can be delivered. As should be appreciated, by avoiding wasting time having a waiter follow a customer through a restaurant as the customer makes a table selection, efficient use of staff is achieved.

Numerous variations on the above described method and apparatus are possible and will be apparent in view of the detailed description which follows.

BRIEF DESCRIPTION OF THE FIGURES

FIG. 10D is a fourth part of a flowchart of an exemplary method of operating a system to use received signals in accordance with an exemplary embodiment.

FIG. 10 comprises the combination of FIG. 10A, FIG. 10B, FIG. 10C and FIG. 10D.

FIG. 11A is a first part of an exemplary assembly of components which may be included in an exemplary system in accordance with an exemplary embodiment.

FIG. 11B is a second part of an exemplary assembly of components which may be included in an exemplary system in accordance with an exemplary embodiment.

FIG. 11C is a third part of an exemplary assembly of components which may be included in an exemplary system in accordance with an exemplary embodiment.

DETAILED DESCRIPTION

Figure 1:
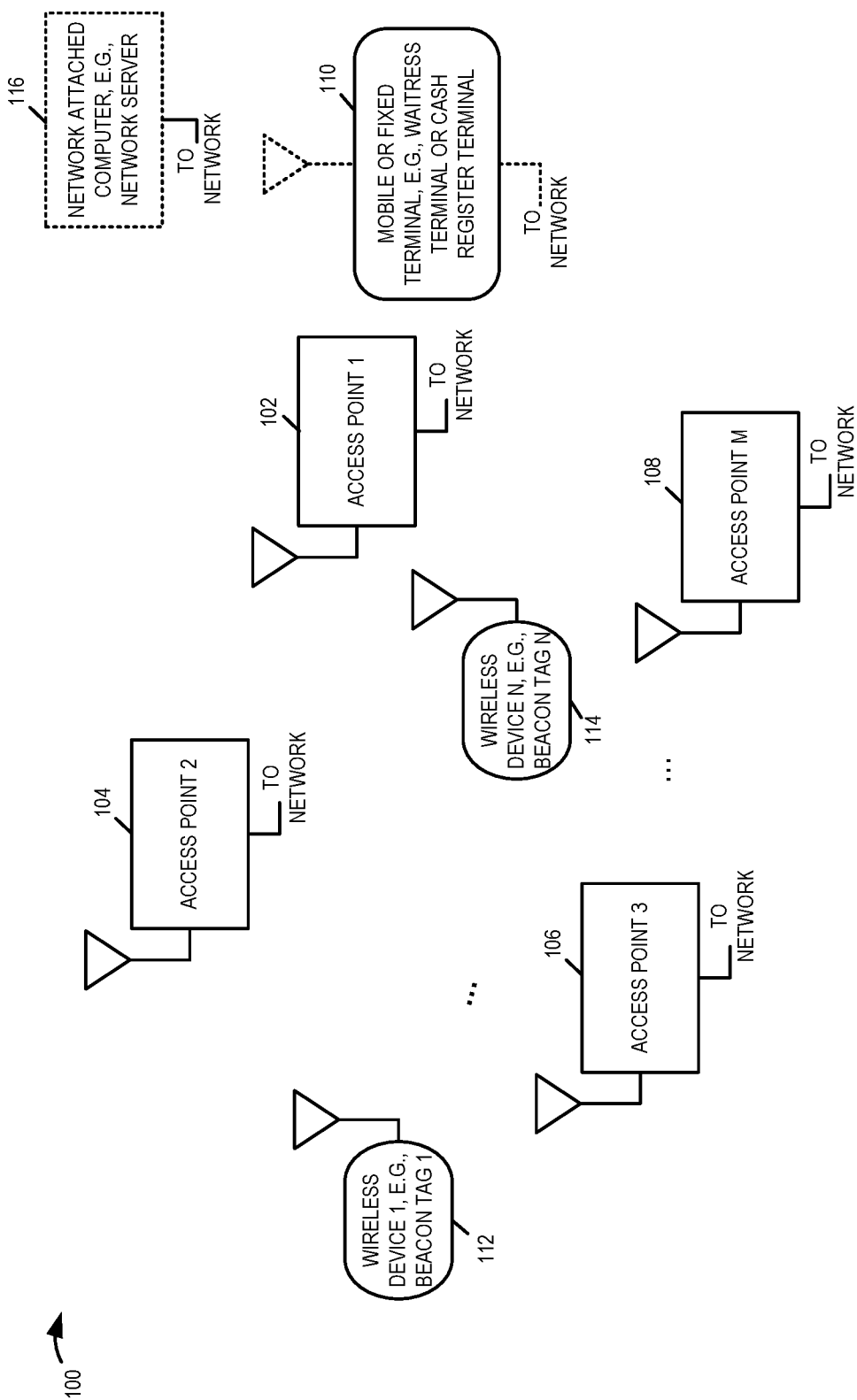
FIG. 1 is a drawing of an exemplary system in accordance with an exemplary embodiment.

FIG. 1 is a drawing of an exemplary system 100 in accordance with an exemplary embodiment. Exemplary system 100 includes a plurality of access points (access point 1 102, access point 2 104, access point 3 106, . . . , access point M 108), a plurality of wireless devices (wireless device 1 112, e.g., beacon tag 1 112, . . . , wireless device N 114, e.g., beacon tag N), and a mobile or fixed wireless terminal 110, e.g., a waitress terminal or cash register terminal. In some embodiments, system 100 further includes a network attached computer 116, e.g., a network server. In some embodiments, network attached computer 116 is a server in a cloud. The wireless devices (112, . . . , 114) are battery powered mobile devices which transmit beacon signals. In some embodiments, the wireless devices (112, . . . , 114) each include a wireless transmitter configured to transmit beacon signals, but do not include a receiver. The access points (102, 104, 106, . . . , 108) monitor for and receive beacon signals, which are transmitted from the wireless devices (112, . . . , 114), and measure the received signal strength (RSS) of the received beacon signals. In some embodiments, an access point makes a wireless device, e.g., wireless device 1 112, position estimation based on received beacon signals detected by the access point or by one or more access points. In some embodiments, network attached computer 116 makes a wireless device, e.g., wireless device 1 112, position estimation based on received beacon signal information from one or more access points. In various embodiments, an access point or the network attached computer, makes a wireless device rate of motion determination based on a rate of change of RSS of measured beacon signals. In some embodiments, different RSS averaging window sizes are used corresponding to different levels of device motion, e.g., with small windows corresponding to higher rates of motion. In some embodiments, machine learning, e.g., regarding one or more path loss parameters, is activated during intervals in which the wireless device is determined to be stationary but is controlled to be inactive during intervals in which the wireless device is determined to be in motion. In some embodiments, the mobile or fixed terminal 110 is notified of the wireless device position when the mobile device is determined to be stationary, e.g., following an anticipated interval of motion. For example, the wireless device may be a beacon transmitter used to track a diner in a restaurant, and the position of the wireless device, indicating the position of the diner, is reported to the waitress's mobile device after the diner has taken a seat at a table.

Figure 2:
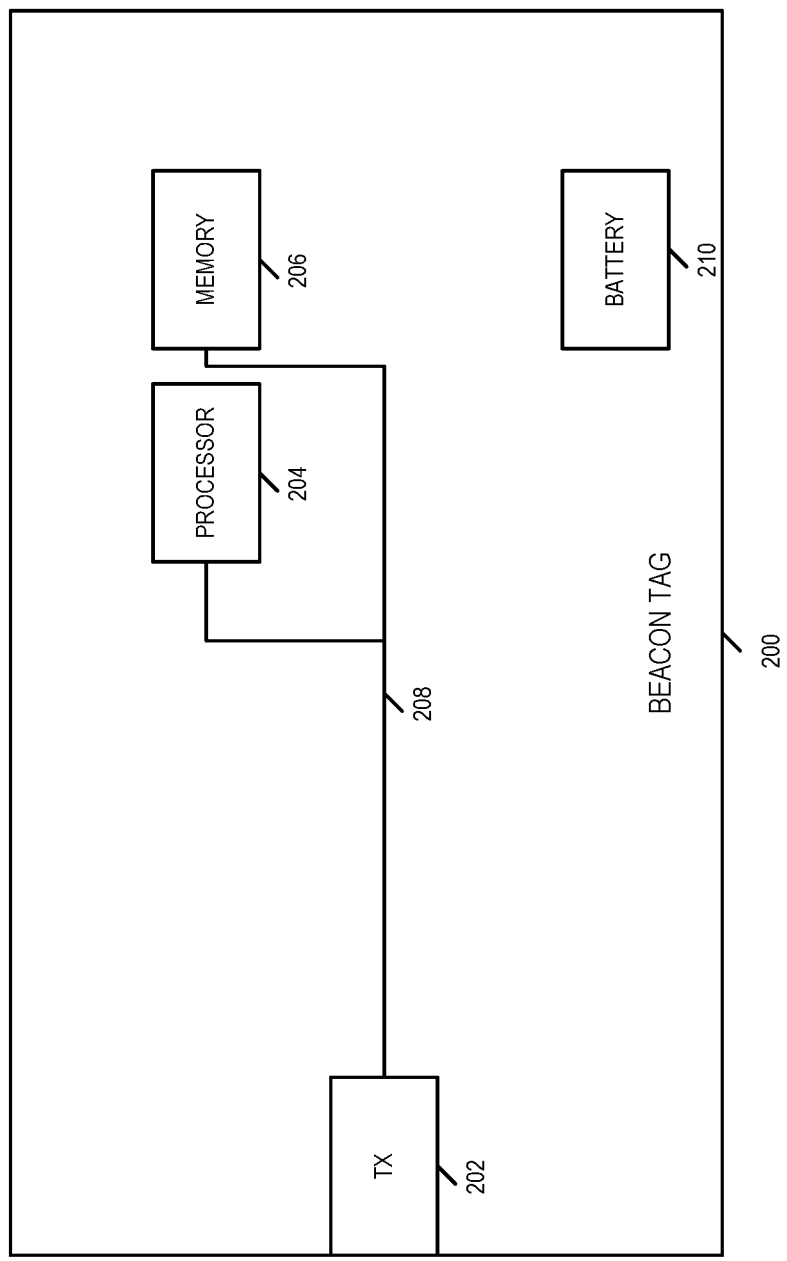
FIG. 2 is a drawing of an exemplary beacon tag in accordance with an exemplary embodiment.

FIG. 2 is a drawing of an exemplary beacon tag 200 in accordance with an exemplary embodiment. Exemplary beacon tag 200 is, e.g., one of the wireless devices (112, . . . 114) of system 100 of FIG. 1. Exemplary beacon tag 200 includes a wireless transmitter 202, a processor 204, and a memory 206 coupled together via a bus 208 over which the various components 102, 204, 206 may interchange data and information. Beacon tag 200 is a mobile device and includes battery 210 for powering the various components 202, 204, 206 of the beacon tag. Processor 204 is configured to generate, using data/information stored in memory 206, a beacon signal, e.g., a beacon signal at a determined transmission power level, said beacon signal conveying information identifying beacon tag 200. Processor 204 is further configured to control wireless transmitter 202 to transmit the generated beacon signal, e.g., on a recurring basis. In one exemplary embodiment, the beacon tag 200 is a Bluetooth low energy (BLE) asset tag.

Figure 3:
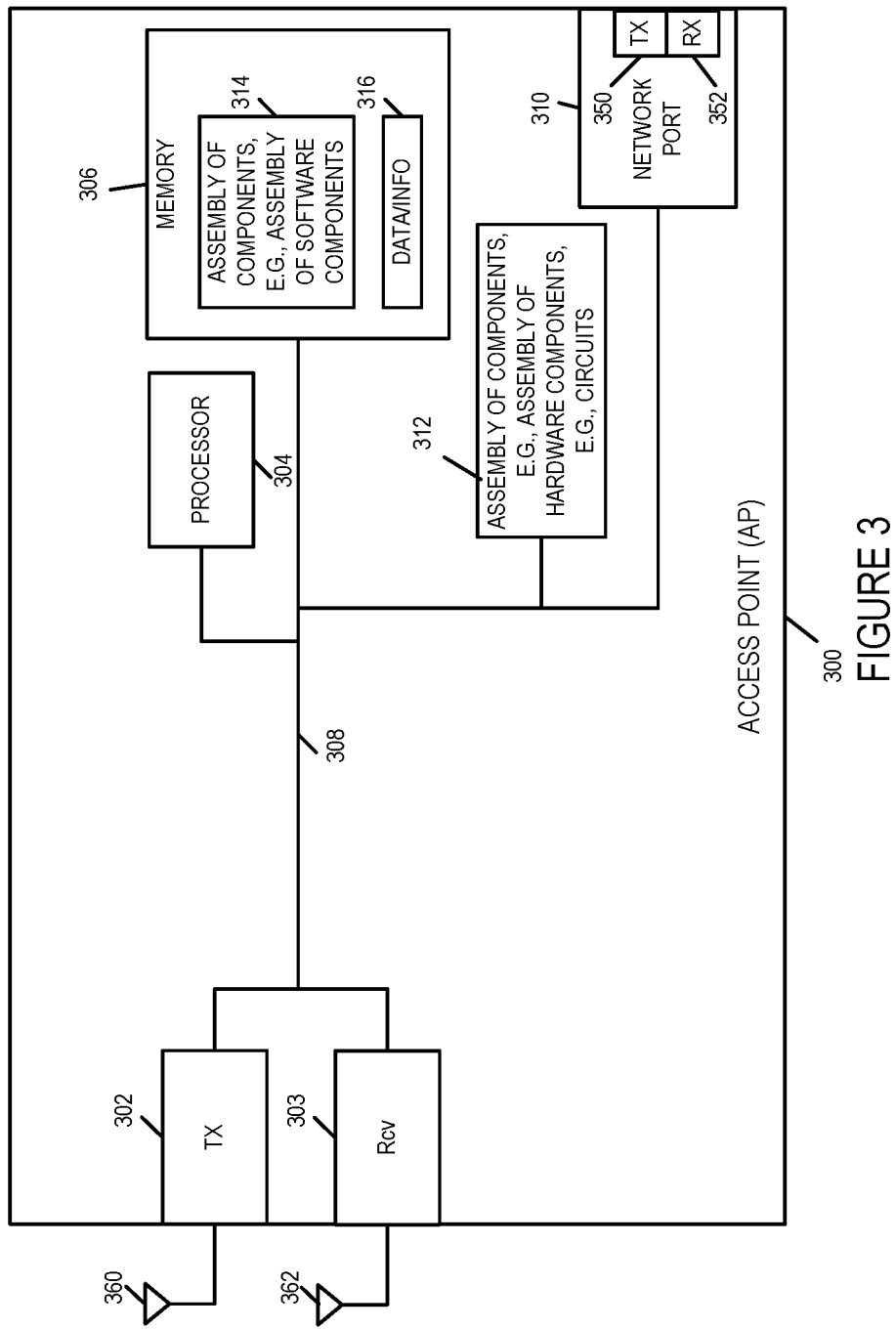
FIG. 3 is a drawing of an exemplary access point (AP) in accordance with an exemplary embodiment.

FIG. 3 is a drawing of an exemplary access point (AP) 300 in accordance with an exemplary embodiment. Exemplary access point 300 is, e.g. any of access points (102, 104, 106, . . . 108) of system 100 of FIG. 1. Access point 300 includes a wireless transmitter 302, a wireless receiver 303, a processor 304, e.g., CPU, memory 306, a network port 306 including a transmitter 350 and a receiver 352, an assembly of components 312, e.g., an assembly of hardware components, e.g., circuits, coupled together via bus 308 over which the various elements (302, 304, 306, 310, 312) may interchange data and information. Wireless receiver 303 is coupled to receive antenna 362 via which the access point 300 receives wireless signals including beacon signals from wireless devices, e.g., wireless device 112. Wireless transmitter 302 is coupled to transmit antenna 360 via which the access point 300 transmits wireless signals.

Memory 306 includes assembly of components 314, e.g., an assembly of software components, and data/information 316. Data/information 316 includes, e.g., received RSS measurements of beacons from a first wireless device, determined RSS deviations, e.g., determined RSSI standard deviations, corresponding to intervals, e.g., 1 sec intervals, of received beacon signal strength measurements from beacon signals from the first wireless device, a first RSS change threshold, a second RSS change threshold, a determined rate of motion of the first wireless device, a determination if the first wireless device is moving or not moving, alternative processing window sizes corresponding to different rates of motion, e.g., 1 sec, 3 sec, 10 sec, a determined processing window size for processing RSS information, based on whether or not the first wireless device is in motion and the determined rate of motion, a first motion rate threshold, a machine learning update decision, a list of one or more path loss parameters to update when the decision is to make a machine learning update, updated path loss parameter(s), a time averaged value of RSS of beacon signals from the first wireless device during a determined processing window, an estimated location of the first wireless device, and a generated message communicating the estimated location of the first wireless device to a mobile or fixed terminal.

Access point 300 is configured to measure the received signal strength of the received beacon signals. In some embodiments, access point 300 is further configured to determine whether or not a wireless device is in motion and the rate of motion based on the rate of change of received signal strength of detected beacon signals. In some embodiments, access point 300 is configured to determine the wireless device's location based on detected beacon signals. In some embodiments, access point 300 is configured to communicate information corresponding to received beacon signals to another access point and/or to a network attached computer, e.g. via a transmitter included in network port 310. In some embodiments, access point 300 is configured to communicate a determined position of a stationary wireless device to a mobile or fixed wireless terminal, e.g. terminal 110, via wireless transmitter 302 or via a transmitter in network port 310. In some embodiments, access point 300 is configured to implement one or more steps of the methods of flowchart 600 of FIG. 6, flowchart 700 of FIG. 7 and/or flowchart 1000 of FIG. 10.

Figure 4:
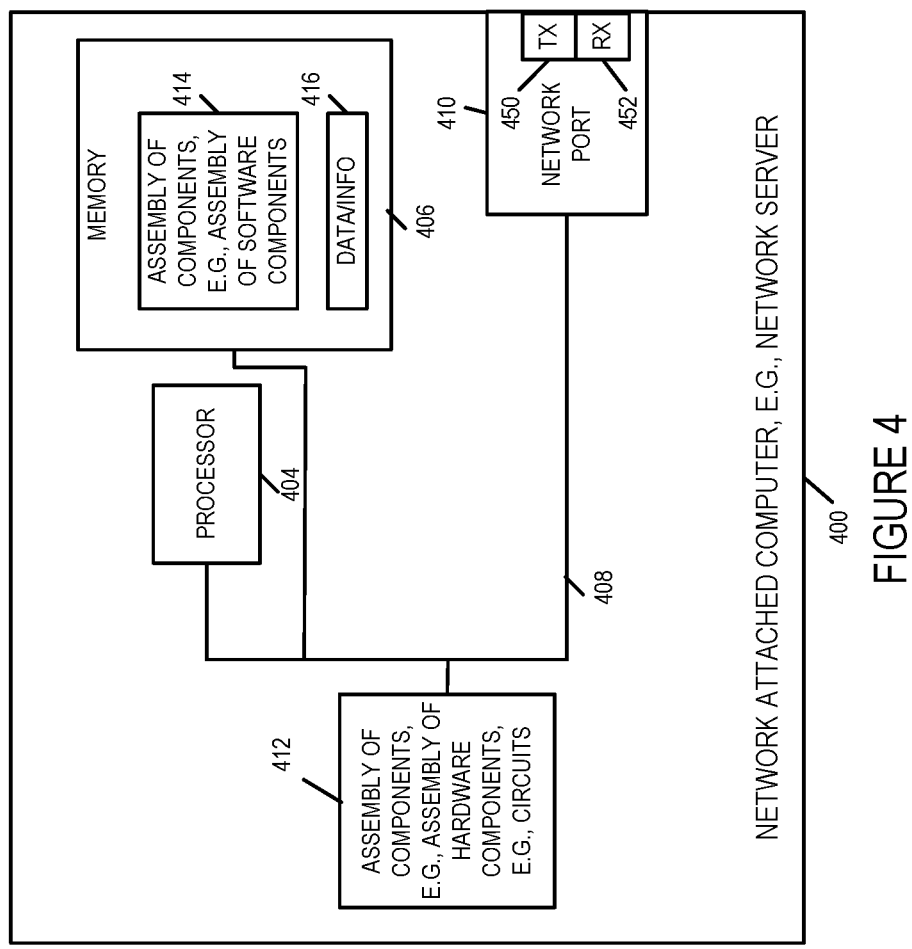
FIG. 4 is a drawing of an exemplary network attached computer, e.g., a network server, in accordance with an exemplary embodiment.

FIG. 4 is a drawing of an exemplary network attached computer 400, e.g., a network server, in accordance with an exemplary embodiment. Exemplary network attached computer 400 includes a processor 404, memory 406, a network port 410 including a transmitter 450 and a receiver 452, and an assembly of components 412, e.g., an assembly of hardware components, e.g., circuits, coupled together via a bus 408 over which the various elements (404, 406, 410, 412) may interchange data and information. Memory 406 includes assembly of components 414, e.g., an assembly of software components, and data/information 416. Network attached computer 400 is, e.g., network attached computer 116 of system 100 of FIG. 1. In some embodiments, network attached computer 400 is configured to implement one or more steps of the methods of flowchart 600 of FIG. 6, flowchart 700 of FIG. 7 and/or flowchart 1000 of FIG. 10.

Figure 5:
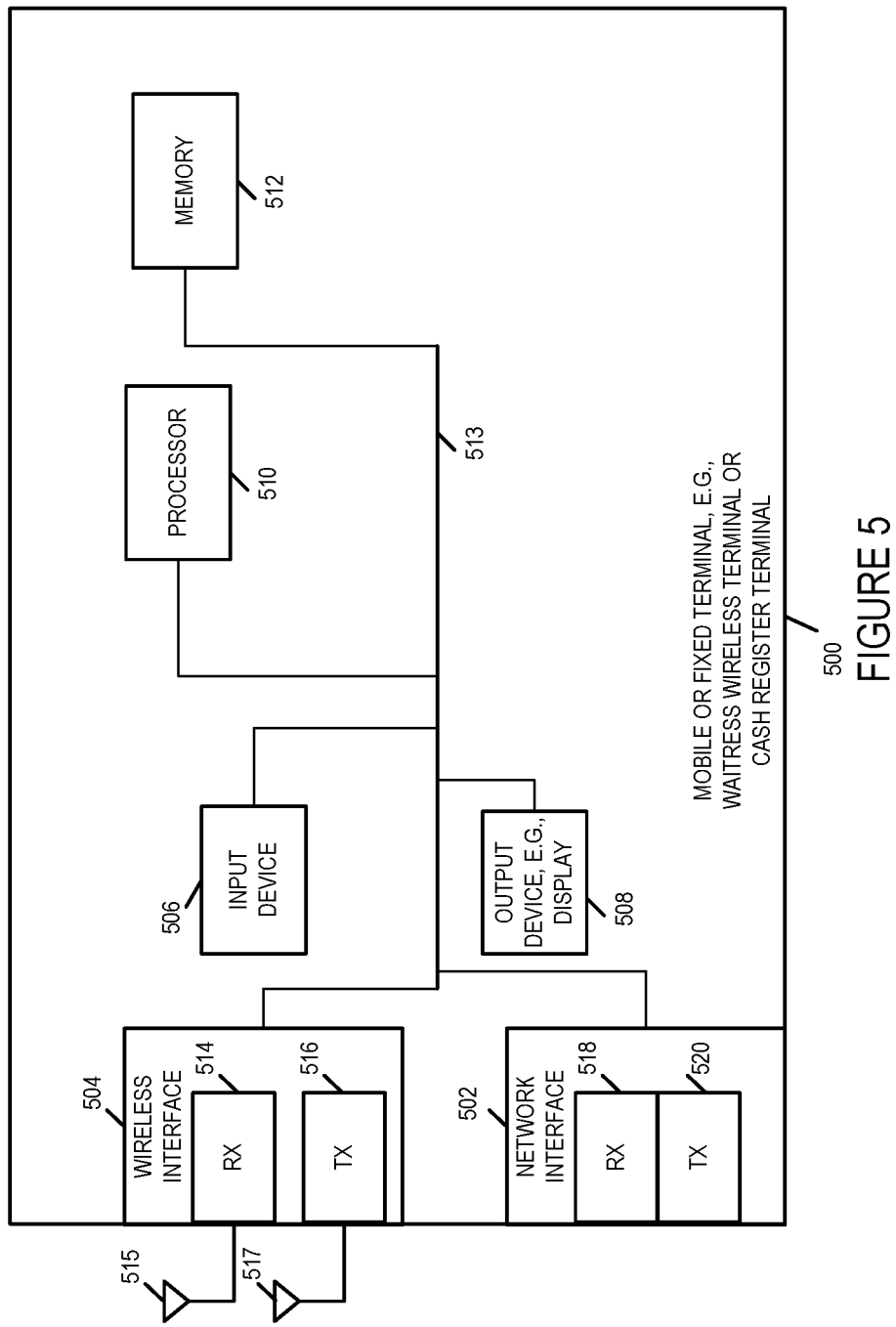
FIG. 5 is a drawing of an exemplary mobile or fixed terminal, e.g., a waitress's wireless terminal or a cash register terminal.

FIG. 5 is a drawing of an exemplary mobile or fixed terminal 500, e.g., a waitress's wireless terminal or a cash register terminal. Exemplary mobile or fixed terminal 500 includes a wireless interface 504, a network interface 502, an input device 506, an output device 508, e.g., a display, a processor 510 and memory 512 coupled together via a bus 513 over which the various elements (502, 504, 506, 508, 510, 512) may interchange data and information. Wireless interface 504 includes a wireless receiver 514 and wireless transmitter 516. Wireless receiver 514 is coupled to receive antenna 515, via which the terminal 500 may receive wireless signals, e.g., a wireless signal communicating an estimated location of a wireless device, e.g., a beacon transmitter. Wireless transmitter 516 is coupled to transmit antenna 517, via which the terminal 500 may transmit wireless signals. Network interface 502 includes a receiver 518 and transmitter 520. Exemplary signals received over network receiver 518 includes a signal communicated an estimated location of a wireless device, e.g. a beacon transmitter.

Figure 6:
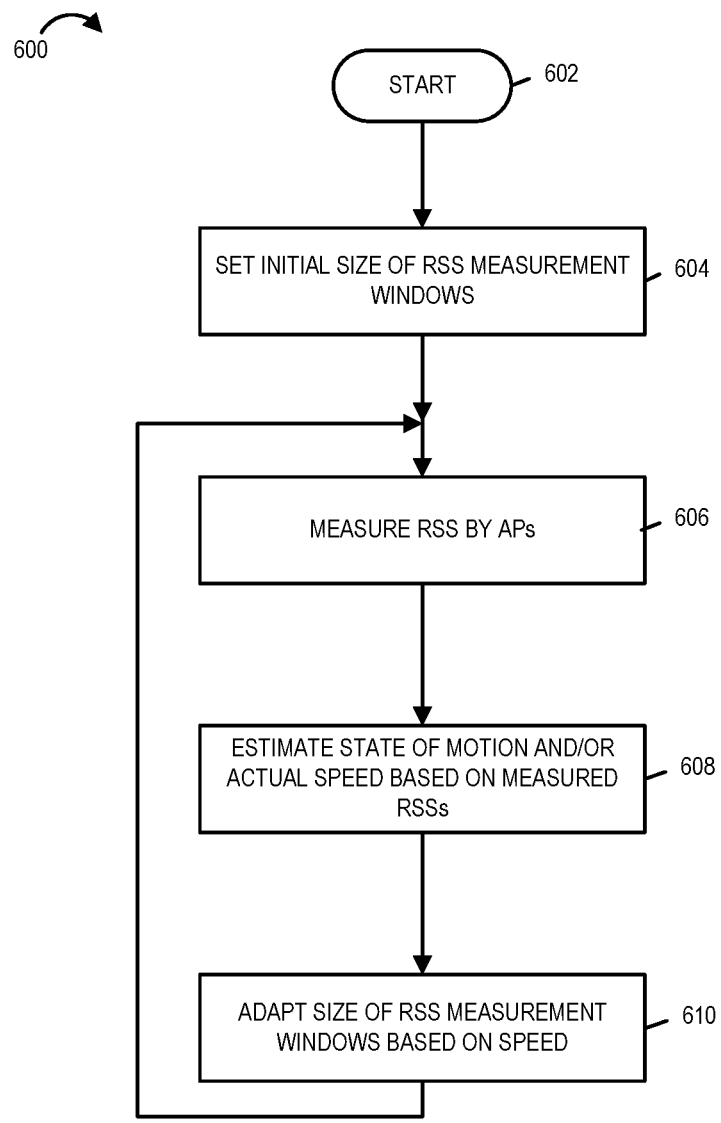
FIG. 6 is a drawing of a flowchart of an exemplary method of operating a system to perform RSS measurements and estimate wireless device speed using an adaptive RSSI measure window in accordance with an exemplary embodiment.

FIG. 6 is a drawing of a flowchart 600 of an exemplary method of operating a system to perform RSS measurements and estimate wireless device speed using an adaptive RSSI measure window in accordance with an exemplary embodiment. In some embodiments, the steps of the method of flowchart 600 are performed by one or more access points, e.g., access 300. In some other embodiments, some of the steps of the method of flowchart 600 are performed by one or more access points, e.g., access 300, and some of the steps of the method of flowchart 600 are performed by a network attached computer, e.g., network attached computer 116.

Operation of the exemplary method starts in step 602 in which the system is powered on and initialized. Operation proceeds from start step 602 to step 604, in which the initial size of RSS measurement windows are set, e.g., to default initialization setting values. Operation proceeds from step 604 to step 606. In step 606 the access point or access points measure the received signal strength, e.g., received signal strength of received beacon signals from a wireless device, e.g., from a beacon tag. Operation proceeds from step 606 to step 608.

In step 608 the state of motion and/or actual speed of the wireless device, e.g., beacon tag, is estimated based on measured RSSs. In some embodiment, the speed of the wireless device is determined based on the rate of change of the RSS of the received beacon signals from the wireless device. For example, if the determined rate of change of RSS is below a first threshold, then the wireless device is determined to be stationary; if the determined rate of change of RSS is below a second threshold, said second threshold being higher than said first threshold, then the wireless terminal is determined to be moving at a slow rate; and if the determined rate of change of RSS is above the second threshold, then the wireless terminal is determined to be moving at a high rate. Operation proceeds from step 608 to step 610.

In step 610, the size of the RSS measurement window is adapted based on the speed of the wireless terminal, e.g., the size of the RSS window is controlled to shrink in size as the rate of motion is determined to increase from no motion to a high rate of motion. Operation proceeds from the output of step 610 to the input of step 606.

Figure 7:
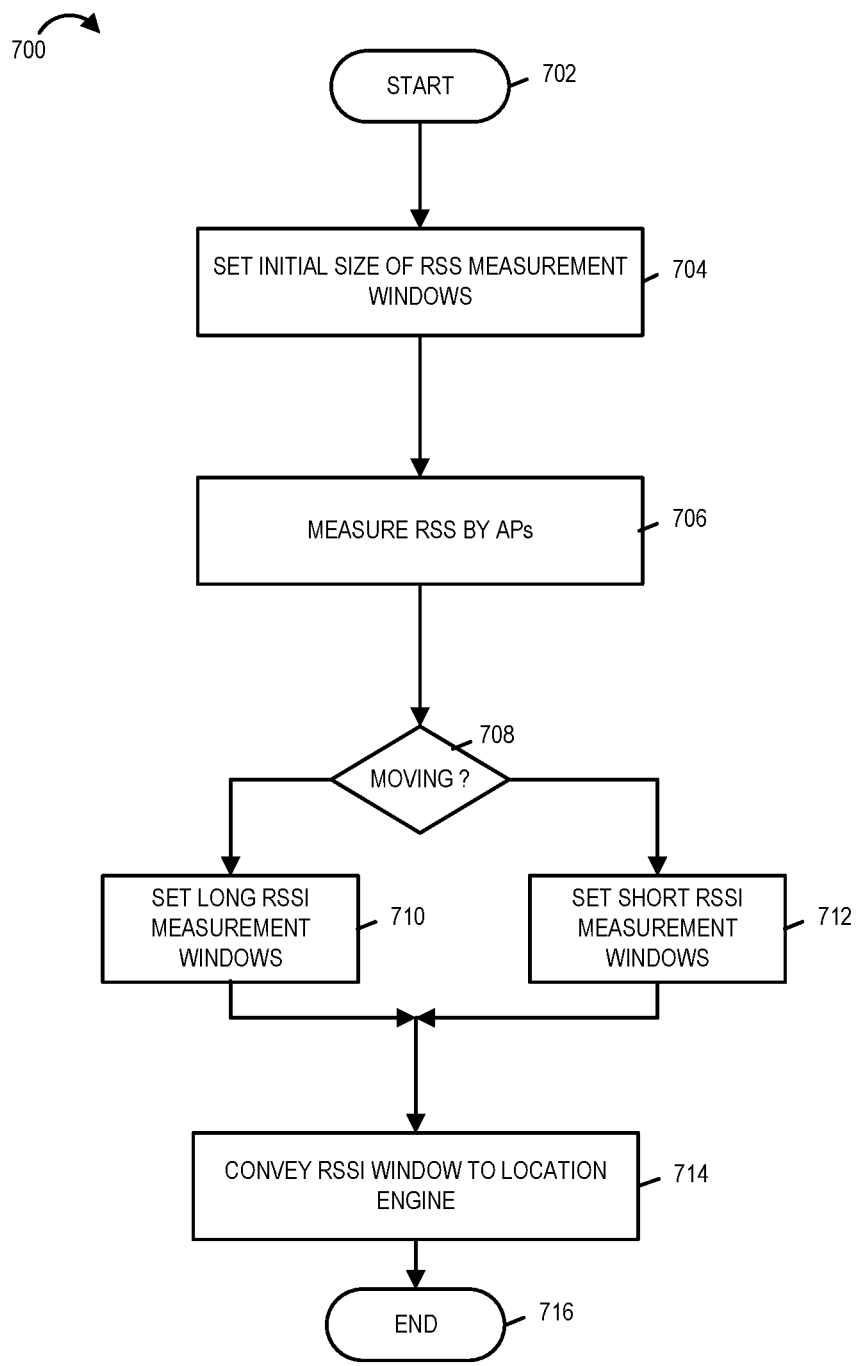
FIG. 7 is a drawing of a flowchart of an exemplary method of operating a system to perform RSS measurements, determine if a wireless device is moving, and set a RSSi measurement window to one or two alternative window sizes in accordance with an exemplary embodiment to facilitate location, motion and/or speed determinations.

FIG. 7 is a drawing of a flowchart 700 of an exemplary method of operating a system to perform RSS measurements, determine if a wireless device is moving, and set a RSSi measurement window to one or two alternative window sizes in accordance with an exemplary embodiment. In some embodiments, the steps of the method of flowchart 700 are performed by one or more access points, e.g., access 300. In some other embodiments, some of the steps of the method of flowchart 600 are performed by one or more access points, e.g., access 300, and some of the steps of the method of flowchart 600 are performed by a network attached computer, e.g., network attached computer 116.

Operation of the exemplary method of flowchart 700 starts in step 702 in which the system is powered on and initialized and proceeds to step 704. In step 704 the size of RSS measurement windows is set to an initial size, e.g., to a default initialization size. Operation proceeds from step 704 to step 706. In step 706 the access point or access points measure the received signal strength, e.g., received signal strength of received beacon signals from a wireless device, e.g., from a beacon tag. Operation proceeds from step 706 to step 708. In step 708 it is determined whether or not the wireless device, e.g., beacon tag, is moving, e.g., based on the determined rate of change of RSS in relation to a motion/no motion threshold. If the determination of step 708 is that the wireless device is moving, then operation proceeds from step 708 to step 712, in which the RSSI measurement windows are set to use a short measurement window. However, if the determination of step 708 is that the wireless device is not moving, then operation proceeds from step 708 to step 710, in which the RSSI measurement windows are set to use a long measurement window. Operation proceeds from step 710 or step 712 to step 714, in which the determined RSSI window, e.g., long window or short window, is conveyed to the location engine. The location engine is used to determine the estimated location of the wireless device. The location engine may be located in an access point or in the network attached computer. In an embodiment, in which the access point determines whether or not the wireless device is moving and the location engine is in the network attached computer, step 714 includes the access point generates and sending a message to the network attached computer communicated whether to use a long or short measurement window. Operation proceeds from step 714 to end step 716.

Figure 8:
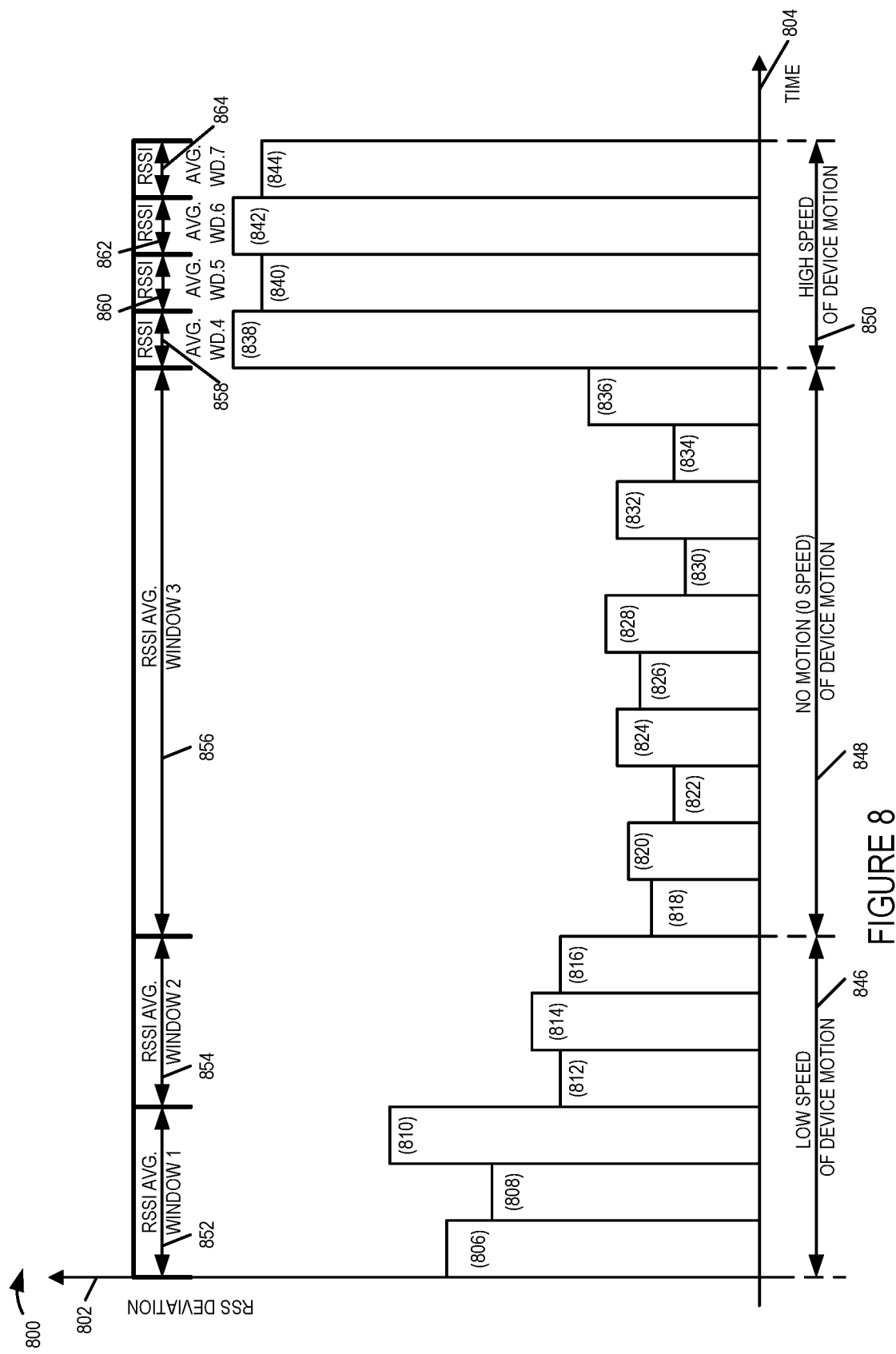
FIG. 8 is a drawing illustrating an adaptive received signal strength indicator (RSSI) averaging window in accordance with an exemplary embodiment.

FIG. 8 is a drawing 800 illustrating an adaptive received signal strength indicator (RSSI) averaging window in accordance with an exemplary embodiment. Vertical axis 802 corresponds to RSS deviation, and horizontal axis 804 corresponds to time. The level of each bar (806, 808, 810, 812, 814, 816, 818, 820, 822, 824, 826, 828, 830, 832, 834, 836, 838, 840, 842, 844) represents a computed RSS deviation corresponding to the measurement of received beacon signals for the wireless device, e.g., beacon tag, for a time interval, e.g., 1 sec, represented by the width of a bar.

During time interval 846, the levels of RSS deviation, represented by the height of bars (806, 808, 810,812, 814, 816) are above a first threshold but below a second threshold; therefore, the wireless terminal is determined to be moving at a low speed during time interval 846.

During time interval 848, the levels of RSS deviation, represented by the height of bars (818, 820, 822, 824, 826, 828, 830, 832, 834, 836) are below the first threshold; therefore, the wireless terminal is determined to be moving at a speed of 0, e.g., the device is not moving and is stationary, during time interval 846.

During time interval 850, the levels of RSS deviation, represented by the height of bars (838, 840, 842, 844) are above the second threshold; therefore, the wireless terminal is determined to be moving at a high speed during time interval 850.

In accordance with a feature of some embodiments, an RSSI averaging window is set as a function of device velocity. In this example, for low speed the RSSI averaging window uses a window having 3 time slots, e.g., a 3 second processing window; for no motion, the RSSI averaging window uses a window having 10 time slots, e.g., a 10 second processing window; and for high speed the RSSI averaging window uses a window having 1 time slot, e.g., a 1 second processing window. RSSI averaging window 1 852 uses RSS measurements corresponding to RSS deviation information 806, 808, 810. RSSI averaging window 2 854 uses RSS measurements corresponding to RSS deviation information 812, 814, 816. RSSI averaging window 3 856 uses RSS measurements corresponding to RSS deviation information 818, 820, 822, 824, 826, 828, 830, 832, 834, 836. RSSI averaging window 4 858 uses RSS measurements corresponding to RSS deviation information 838. RSSI averaging window 5 860 uses RSS measurements corresponding to RSS deviation information 840. RSSI averaging window 6 862 uses RSS measurements corresponding to RSS deviation information 842. RSSI averaging window 7 864 uses RSS measurements corresponding to RSS deviation information 844.

In some embodiments, the RSSI averaging window, which may be different sizes at different times, is used by a location engine when determining the location of the wireless device, e.g., beacon tag.

Figure 9:
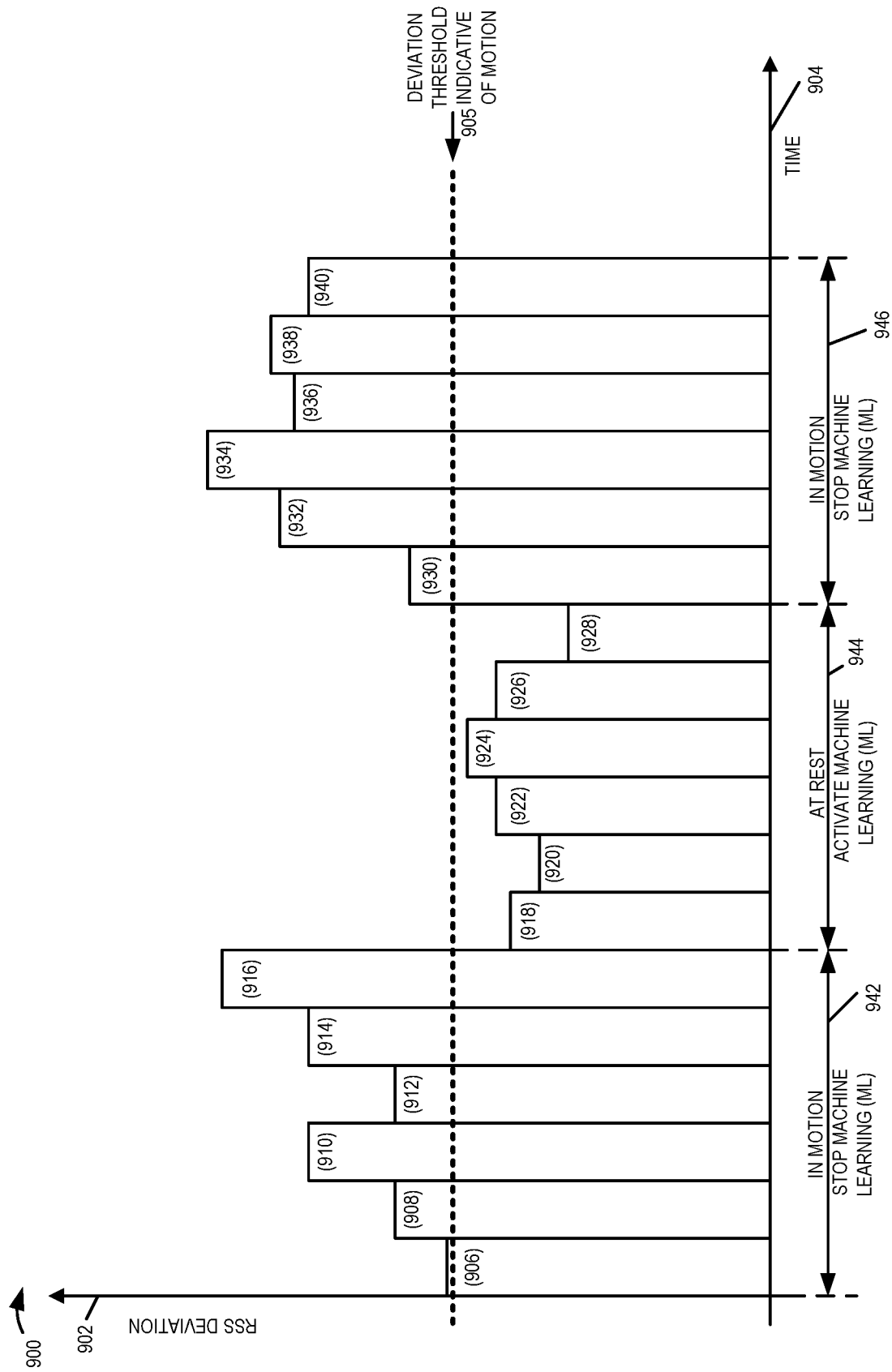
FIG. 9 is a drawing illustrating a state of motion determination in the form of a binary speed determination based on RSS measurements and whether or not to activate machine learning based on the binary speed determination in accordance with an exemplary embodiment.

FIG. 9 is a drawing 900 illustrating binary speed determination based on RSS measurements and whether or not to activate machine learning based on the binary speed determination in accordance with an exemplary embodiment. Vertical axis 902 corresponds to RSS deviation, and horizontal axis 904 corresponds to time. Dashed horizontal line 905 represents the exemplary RSS deviation threshold used to determine whether or not the wireless device is in motion. The level of each bar (906, 908, 910, 912, 914, 916, 918, 920, 922, 924, 926, 928, 930, 932, 934, 936, 938, 940) represents an RSS deviation corresponding to measurements of received beacon signal for the wireless device, e.g., beacon tag. During time interval 942 each of the bars 906, 908, 910, 912, 914, 916 is above the deviation threshold 905, which indicates that the wireless device is in motion. During time interval 944 each of the bars 918, 920, 922, 924, 926, 928 is below the deviation threshold 905, which indicates that the wireless device is at rest. During time interval 946 each of the bars 930, 932, 934, 936, 938, 940 is above the deviation threshold 905, which indicates that the wireless device is in motion. In accordance with a feature of various embodiments, when the wireless device is determined to be in motion, machine learning (ML), e.g., with regard to one or more path loss parameters, is stopped; and when the wireless device is determined to be at rest, machine learning (ML), e.g., with regard to one or more path loss parameters, is activated. Therefore in the example of FIG. 9, machine learning is stopped during time interval 942, is active during time interval 944, and is stopped during time interval 946.

Figure 10A:
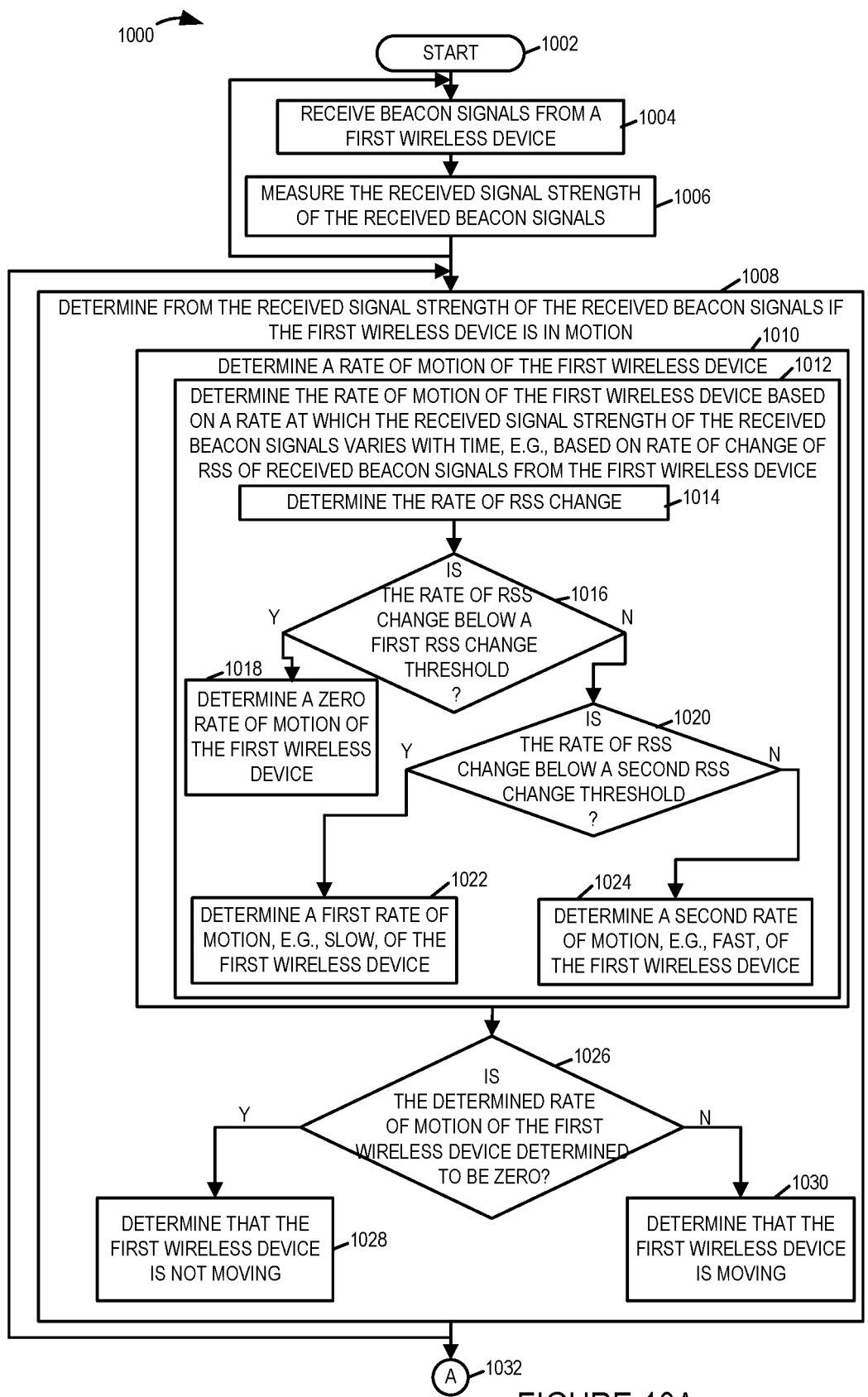
FIG. 10A is a first part of a flowchart of an exemplary method of operating a system to use received signals in accordance with an exemplary embodiment.
Figure 10B:
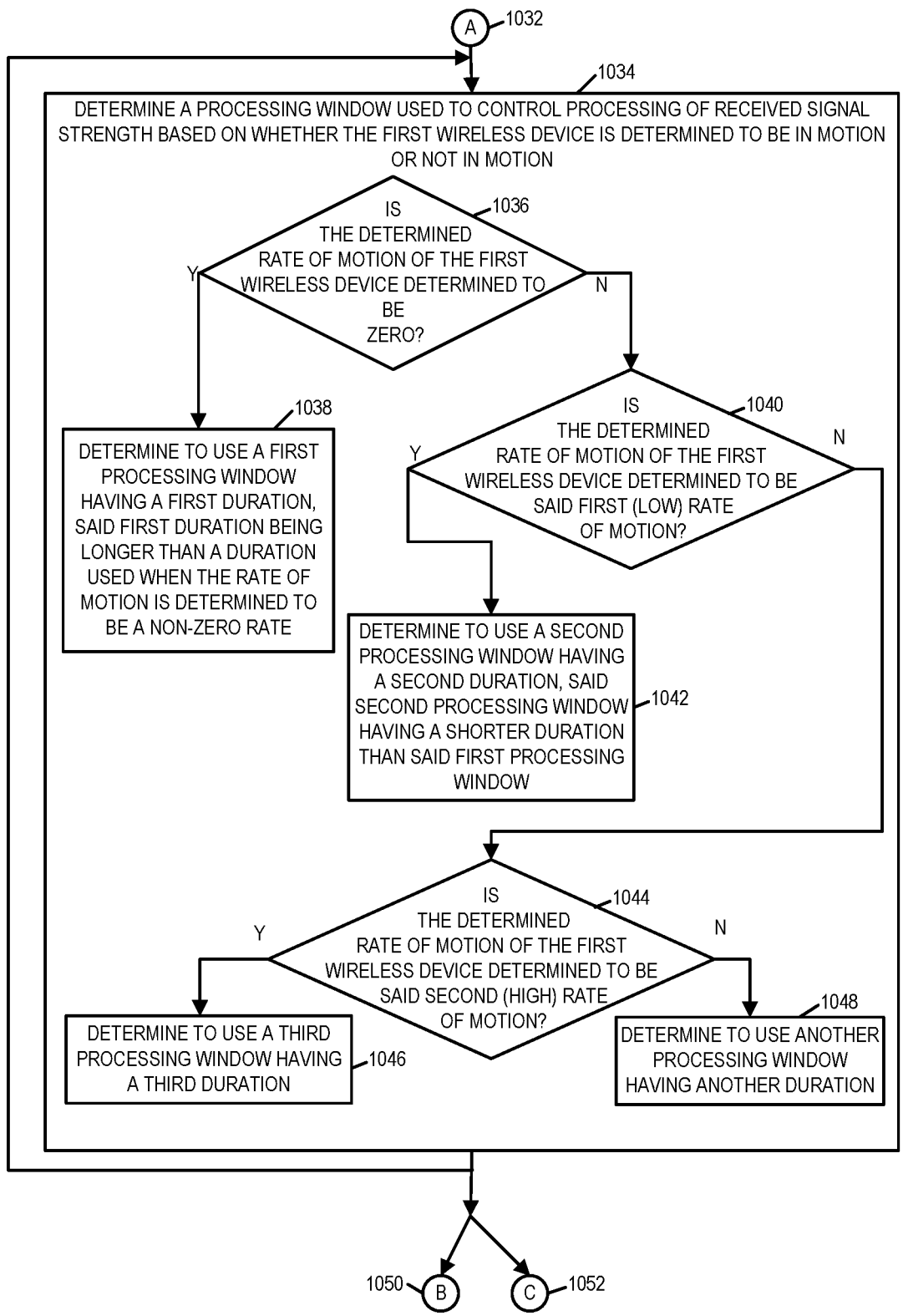
FIG. 10B is a second part of a flowchart of an exemplary method of operating a system to use received signals in accordance with an exemplary embodiment.
Figure 10C:
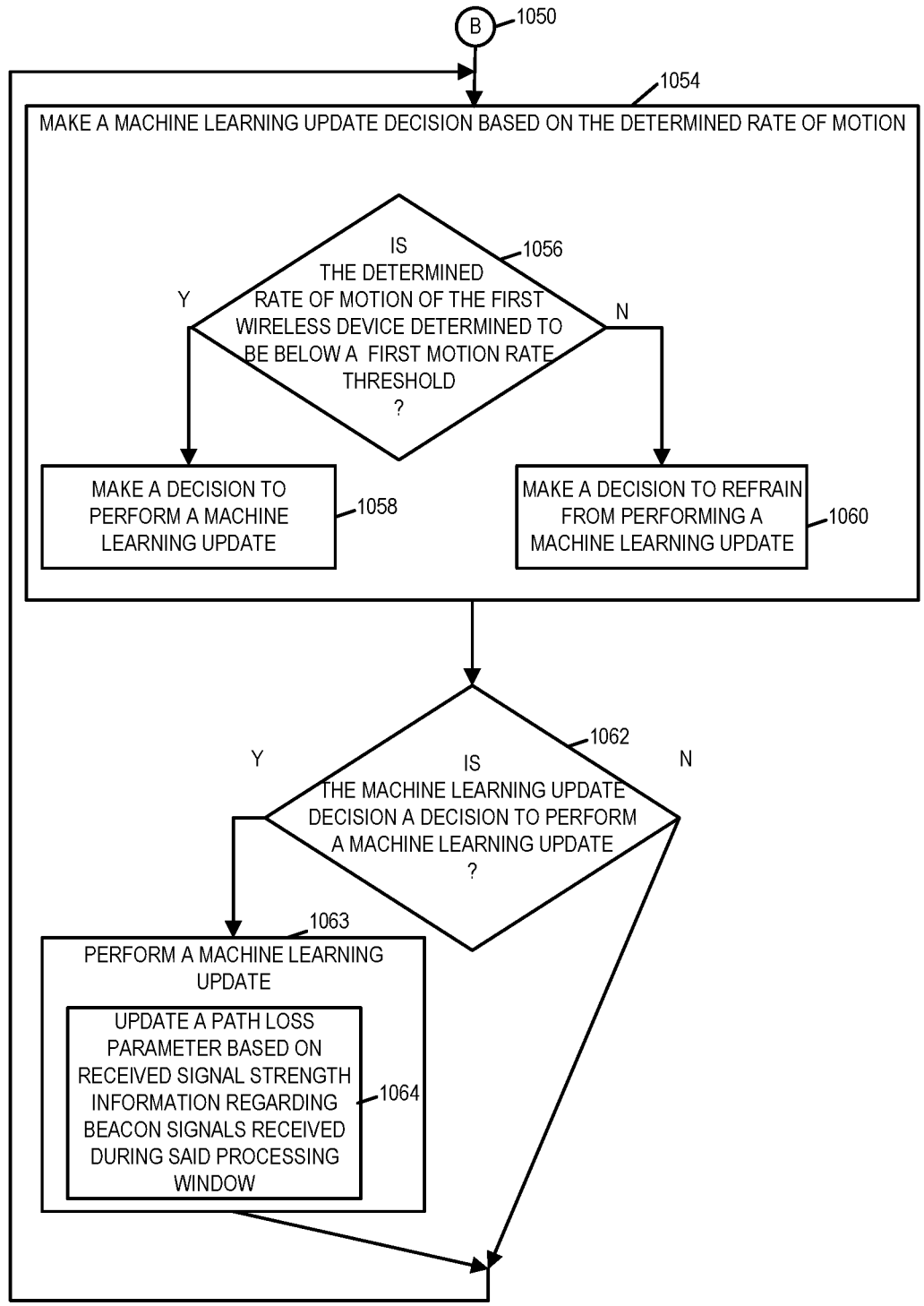
FIG. 10C is a third part of a flowchart of an exemplary method of operating a system to use received signals in accordance with an exemplary embodiment.

FIG. 10, comprising the combination of FIG. 10A, FIG. 10B, FIG. 10C and FIG. 10D, is a flowchart 1000 of an exemplary method of operating a system to use received signals in accordance with an exemplary embodiment. Operation starts in step 1002 in which the system is powered on and initialized. Operation proceeds from step 1002 to step 1004.

In step 1004 an access point receives beacon signals from a first wireless device. In some embodiments, the first wireless device is a wireless beacon transmitter which does not include a wireless receiver. Operation proceeds from step 1004 to step 1006. In step 1006 the access point measures the received signal strength of the received beacon signals. In some embodiments, measuring a received signal strength of a received beacon signal includes determining a received signal strength indicator value. Steps 1004 and 1006 are performed on an ongoing basis.

Operation proceeds from step 1006 to step 1008. In step 1008 it is determined from the received signal strength of the received beacon signals if the first wireless device is in motion. In some embodiments, step 1008 is performed by the access point which received and measured the beacon signals. In other embodiments, step 1008 is performed by a different device than the access point which received and measured the beacon signals, e.g., another access point, or a network server.

Figure 15:
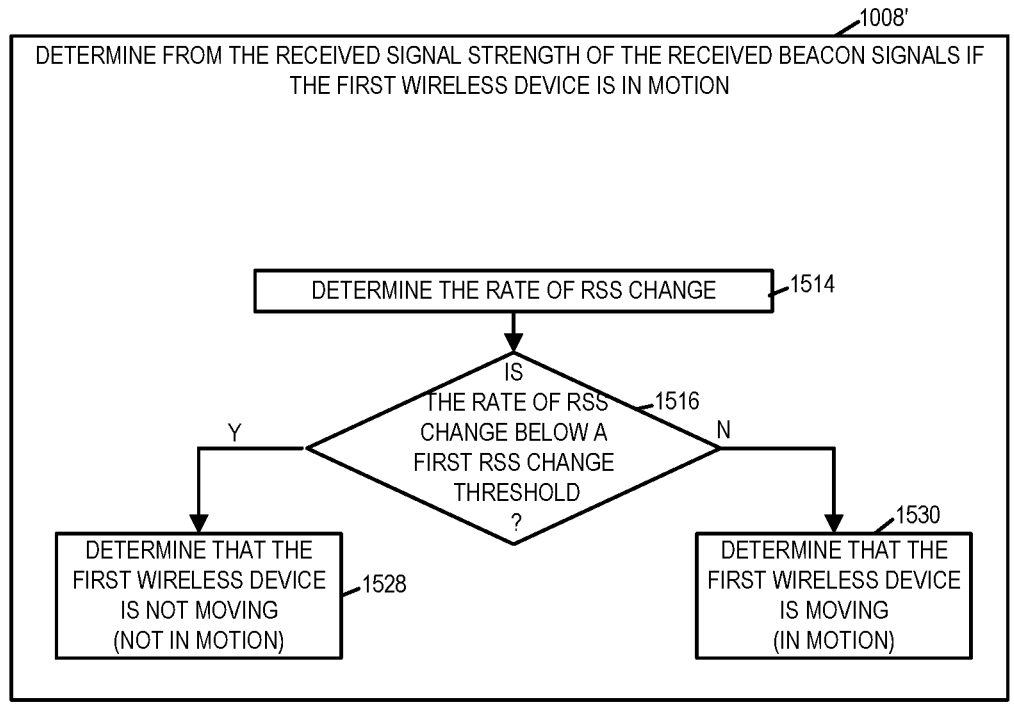
FIG. 15 is a diagram of a set of steps which can be used in the method shown in FIG. 10 in a simple approach to determining from the received signal strength of received beacon signals if a wireless device is in motion.

Step 1008 includes, in some embodiments, one more or all of steps 1010, 1026, 1029 and 1030 as shown in FIG. 10. However in other simpler embodiments such as the one shown in FIG. 15, step 1008 is replaced with step 1008' and involves a simple determination of whether the device is in a state of motion or at rest based on the rate of change of the RSS of the received beacon signals. In such a case a determination of no motion can be viewed as a determination of a zero or very low speed that is interpreted as a zero (no motion) speed and a higher speed which is interpreted as motion. An actual speed determination need not be made with the rate and/or amount of RSS signal changes being used to determine whether the device is in a no motion state, e.g., with RSS changes below a first threshold amount or rate of change being interpreted as no motion and RSS signal changes above the first threshold amount or rate being interpreted as indicating motion.

Step 1008', like step 1008, involves determining from the received signal strength of the received beacon signals if the first wireless device is in motion. In the FIG. 15 example, step 1008' includes determining the rate of RSS change for signals received from the first wireless device and then checking in step 1516 if the rate of RSS change is below a first RSS change threshold which may be the same or different from the first RSS change threshold used in step 1008. If the rate of RSS change is determined in step 1516 to be below the first RSS change threshold, operation proceeds to step 1528 wherein it is determined that the first wireless device is not moving, i.e., not in motion. However if in step 1516 it si determined that the rate of RSS change is equal to or above the first RSS change threshold operation proceeds to step 1530 in which it is determined that the first wireless device is moving, i.e., in motion.

In other embodiments such as ones which include the more detailed step 1008 shown in FIG. 10, a more detailed rate of motion of the first wireless device is determined rather than a simple binary rate (motion/no motion). For example a determination may be and sometimes is made between which of a plurality of 3 or more rates corresponding to different speed ranges, the first wireless device is moving at.

Step 1010 includes steps 1012, in which the rate of motion of the first wireless device is determined based on a rate at which the received signal strength of the received beacon signals varies with time, e.g., based on a rate of change of RSS of received beacon signals from the first wireless device. Step 1012 includes step 1014, 1016, 1018, 1020, 1022 and 1024.

In step 1014 the rate of RSS change is determined. Operation proceeds from step 1014 to step 1016. In step 1016 it is determined if the rate of RSS change is below a first RSS change threshold. In some embodiments, the first RSS change threshold is a noise threshold, e.g., a low threshold, which might be expected for a static device, e.g., due to noise and/or normal changes in the environment. If the determination of step 1016 is that the rate of RSS change is below the first RSS change threshold, then operation proceeds from step 1016 to step 1018, in which it is determined that the rate of motion of the first wireless device is a zero rate of motion, e.g., not moving. However, if the determination of step 1016 is that the rate of RSS change is not below the first RSS change threshold, then operation proceeds from step 1016 to step 1020, in which it is determined if the rate of change of RSS is below a second RSS change threshold. If the determination of step 1020 is that the rate of RSS change is below the second RSS change threshold, then operation proceeds from step 1020 to step 1022, in which it is determined that the rate of motion of the first wireless device is a first rate of motion, e.g., a slow rate of motion. However, if the determination of step 1020 is that the rate of RSS change is not below the second RSS change threshold, then operation proceeds from step 1020 to step 1024, in which it is determined that the rate of motion of the first wireless device is a second rate of motion, e.g., a fast rate of motion.

Operation proceeds from step 1010 to step 1026. In step 1026 it is determined if the determined rate of motion of the first wireless device is equal to zero. If the determination of step 1026 is that the determined rate of motion of the first wireless device is zero, then operation proceeds from step 1026 to step 1028 in which it is determined that the first wireless device is not moving. However, if the determination of step 1026 is that the determined rate of motion of the first wireless device is not zero, then operation proceeds from step 1026 to step 1030 in which it is determined that the first wireless device is moving.

Step 1008 is performed on an ongoing basis. Operation proceeds from step 1008 via connecting node A 1032 to step 1034.

In step 1034 a processing window is determined based on whether or not the first wireless device is determined to be in motion or not in motion, said processing window being used to control processing of received signal strength. In some embodiments, a short processing window is used for time averaging if the first wireless device is in motion and a longer processing window is used for time averaging if the first wireless device is not in motion since the signal strength should be stable if the first wireless device is not in motion. If the first wireless device is in motion it is desirable to have a short processing window which will result in less averaging and a more temporal value. In some embodiments, step 1034 is performed by the access point which received and measured the beacon signals. In other embodiments, step 1034 is performed by a different device than the access point which received and measured the beacon signals, e.g., another access point, or a network server.

Step 1034 includes at least steps 1036, 1038 and 1042. These steps are used in the simple implementation which uses step 1018' instead of step 1018. Steps 1040, 1044, 1046 and 1048 are additionally included in step 1034 in embodiments where step 1018 is used and multiple speed rates are considered as opposed to making a simple motion/no motion determination. In step 1036 it is determined if the determined rate of motion of the first wireless device is determined to be zero, e.g., was the first wireless device determined not to be in motion. If the determined rate of motion of the first wireless device is determined to be zero (not in motion), then operation proceeds from step 1036 to step 1038, in which a determination is made to use a first processing window having a first duration, said first duration being longer than a duration used when the rate of motion is determined to be a non-zero rate. However, if the determined rate of motion of the first wireless device is not determined to be zero e.g., the first wireless device was determined to be in motion, then operation proceeds from step 1036 to step 1040 in cases where step 1008 is used or directly to step 1042 in embodiments where step 108' is used.

In step 1040 a check is made to determine if the determined rate of motion of the first wireless device is said first (low) rate of motion. If the determined rate of motion is the first (low) rate, then operation proceeds from step 1040 to step 1042.

In step 1042 it is determined to use a second processing window having a second duration, said second processing window having a shorter duration than said first processing window. If the determined rate of motion of the first wireless device is not the first (low) rate of motion, then operation proceeds from step 1040 to step 1044.

In step 1044 it is determined if the rate of motion of the first wireless device has been determined to be said second (high) rate of motion. If the determination is that the rate of motion of the first wireless device is the second (high) rate of motion, then operation proceeds from step 1044 to step 1046 in which it is determined to use a third processing window having a third duration, e.g. said third duration being shorter than said second duration. However, If the determination is that the rate of motion of the first wireless device is not the second (high) rate of motion, then operation proceeds from step 1044 to step 1048 in which it is determined to use another processing window, e.g., a fourth processing window corresponding to a very high rate of motion, having another duration, e.g. a fourth duration being shorter than said third duration.

Step 1034 is performed on an ongoing basis. Operation proceeds from step 1034 via connecting node B 1050 to step 1054 and via connecting node C 1052 to 1066.

In step 1054 a machine learning update decision is made based on the determined rate of motion. Step 1054 includes steps 1056, 1058 and 1060. In step 1056 it is determined if the rate of motion of the first wireless device is below a first motion rate threshold, e.g., first wireless device is moving. If the determination is that the rate of motion of first wireless device is determined to be below the first motion rate threshold, then operation proceeds from step 1056 to step 1058 in which a decision is made to perform a machine learning update. However, if the determination is that the rate of motion of first wireless device is not determined to be below the first motion rate threshold, then operation proceeds from step 1056 to step 1060 in which a decision is made to refrain from perform a machine learning update.

Operation proceeds from step 1054 to step 1062. In step 1062 if the decision of step 1054 is a decision to perform a machine learning update, then operation proceeds from step 1062 to step 1063 in which a machine learning update is performed. Step 1063 includes step 1064 in which a path loss parameter is updated based on received signal strength information regarding beacon signals received during said processing window. Operation proceeds from step 1064 to the input of step 1054. However, in step 1062 if the decision of step 1054 is a decision not to perform a machine learning update, then step 1064 is bypassed, and operation proceeds from step 1062 to the input of step 1054.

Returning to step 1066, in step 1066 the location of the first wireless device is estimated based on the strength of received signals received during said determined processing window. Step 1066 includes step 1068, in which the received signals strength of beacon signals received from the first wireless device are time averaged during said determined processing window. In various embodiments, the number of samples in the processing window will be larger when there is no or little motion due to a larger determined processing window than when there is a high rate of motion. Step 1066 is performed on an ongoing basis. Operation proceeds from step 1066 to step 1070.

In step 1070 if the first wireless device is determined to be not moving, e.g., for at least a predetermined period of time following motion, then operation proceeds from step 1070 to step 1072, in which the estimated location of the first wireless device is communicated to a mobile or fixed terminal configured to indicate the location of the first wireless device to a user of the mobile or fixed terminal, e.g., a waitress terminal or cash register terminal. Thus in some embodiments, the location of the first wireless device, e.g., beacon transmitter, is not communicated to the mobile or fixed terminal until the first wireless terminal is determined to be not moving, e.g., the customer has settled at a table where the food or other goods are to be delivered. However, in step 1070 if the first wireless device is not determined to be not moving, then operation proceeds from step 1070 to the input of step 1070 for another test at a later point in time.

Figure 11:
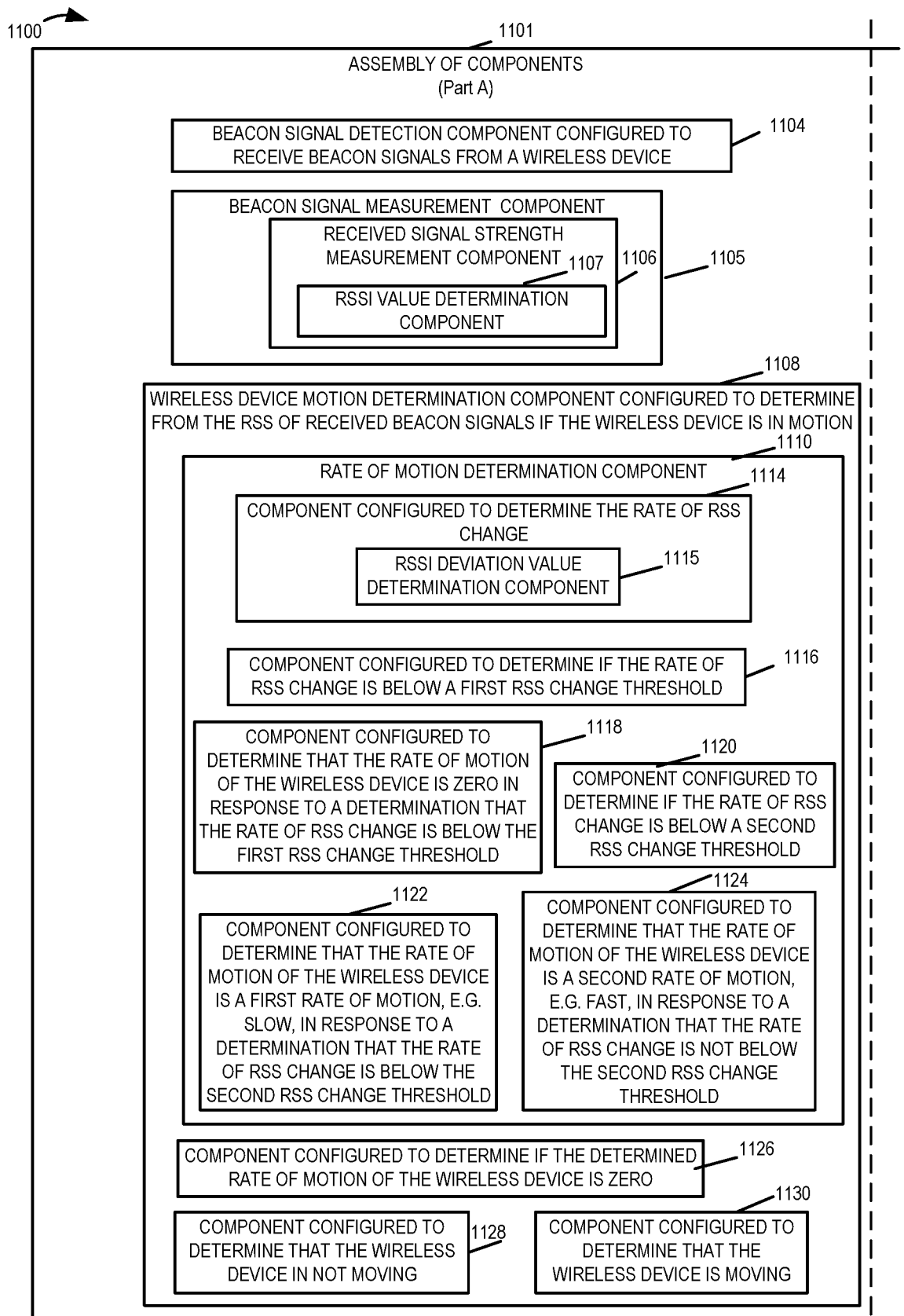
FIG. 11 comprises the combination of FIG. 11A, FIG. 11B, and FIG. 11C.
Figure 11:
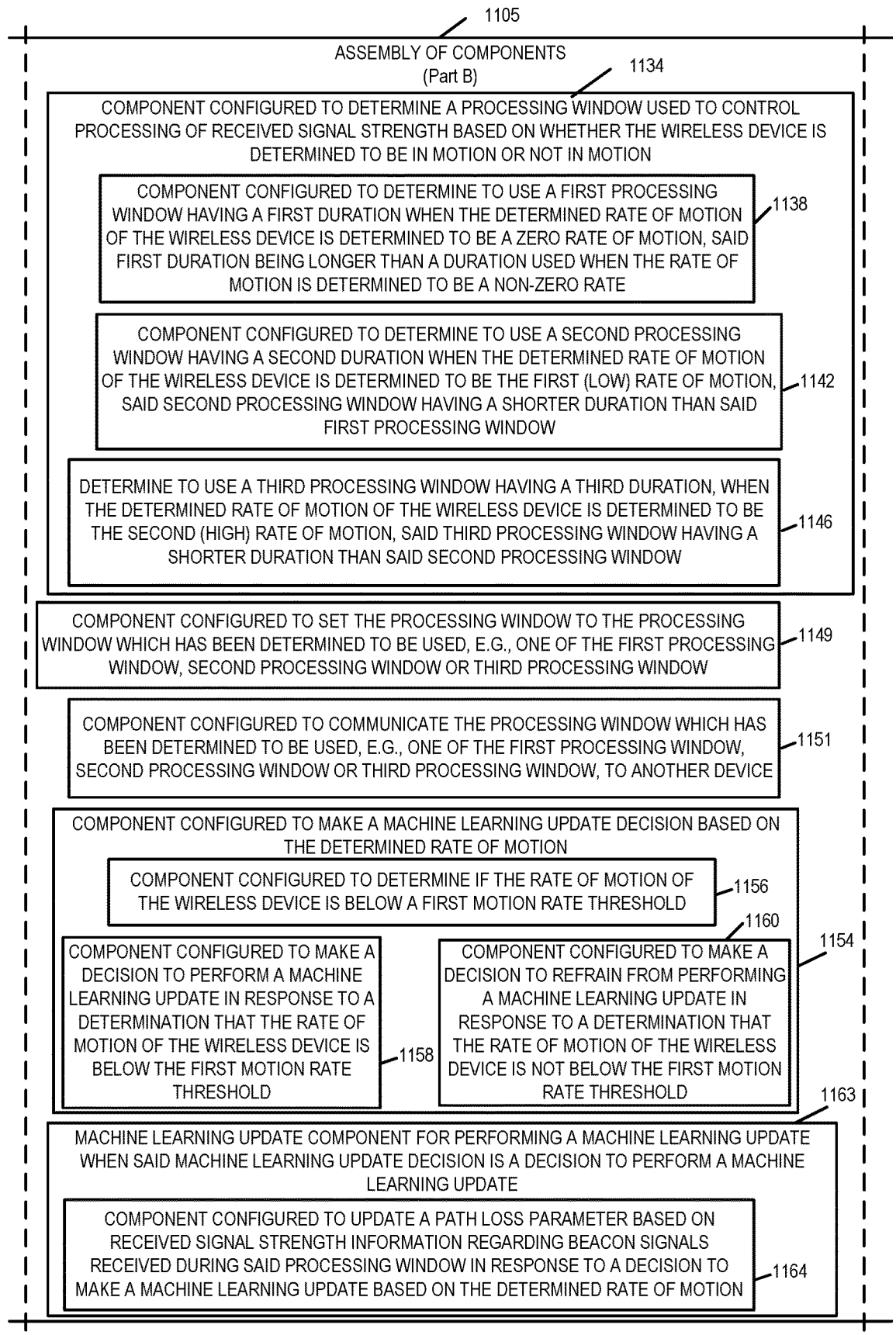
Figure 11:
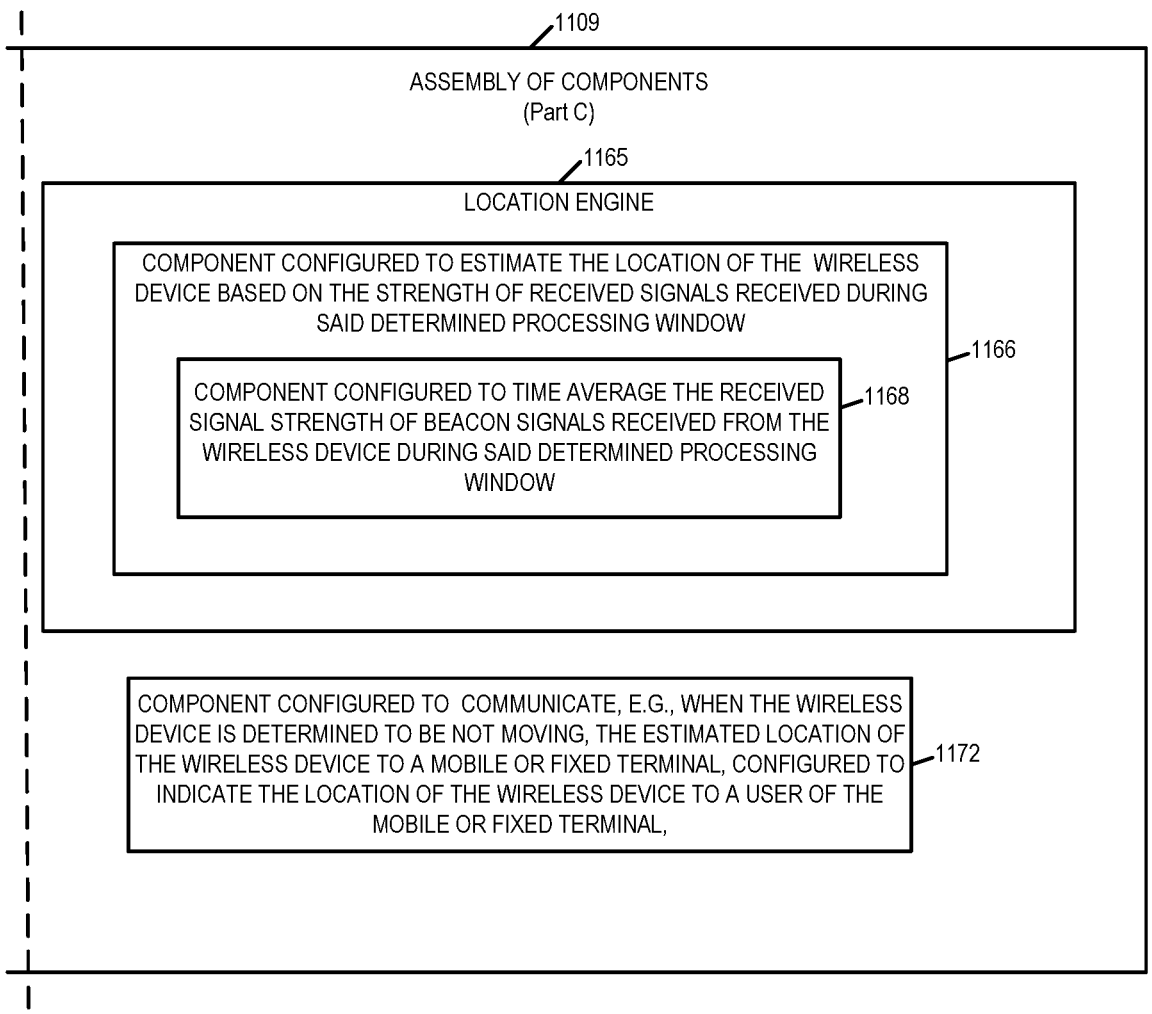
Figure 11:

FIG. 11, comprising the combination of FIG. 11A, FIG. 11B and FIG. 11C, is a drawing of an exemplary assembly of components 1100, comprising the combination of Part A 1101, Part B 1105 and Part C 1109, which may be included in an exemplary system, e.g., in an access point or in a combination of one or more access points and/or in a network attached computer, e.g., a network server, in accordance with and exemplary embodiment.

In some embodiments, assembly of components 1100 is included in an access point, e.g., a wireless access point, e.g., access point 300 of FIG. 3, AP 1 102, AP 2 104, AP 3 106, . . . , AP M 108, of FIG. 1, implemented in accordance with an exemplary embodiment.

The components in the assembly of components 1100 can, and in some embodiments are, implemented fully in hardware within a processor, e.g., processor 304, e.g., as individual circuits. The components in the assembly of components 1100 can, and in some embodiments are, implemented fully in hardware within an assembly of components 312, e.g., assembly of hardware components, external to the processor, e.g., as individual circuits corresponding to the different components. In other embodiments some of the components are implemented, e.g., as circuits, within the processor 304 with other components being implemented, e.g., as circuits within and assembly of components 312, external to and coupled to the processor 304. As should be appreciated the level of integration of components in the processor and/or with some components being external to the processor may be one of design choice.

Alternatively, rather than being implemented as circuits, all or some of the components may be implemented in software and stored in the memory of a device, with the components controlling operation of device to implement the functions corresponding to the components when the components are executed by a processor. In some such embodiments, the assembly of components 1100 is included in a memory, e.g., assembly of components 314 in memory 306. In some such embodiments, the assembly of components is included as part of the routines in memory. In still other embodiments, various components in assembly of components 1100 are implemented as a combination of hardware and software, e.g., with another circuit external to the processor providing input to a processor which then under software control operates to perform a portion of a component's function. While shown in various embodiments as a single processor 304, e.g., computer, it should be appreciated that the processor may be implemented as one or more processors, e.g., computers.

When implemented in software the components include code, which when executed by the processor, configure the processor to implement the function corresponding to the component. In embodiments where the assembly of components 1100 is stored in memory, the memory is a computer program product comprising a computer readable medium comprising code, e.g., individual code for each component, for causing at least one computer, e.g., a processor, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 11 control and/or configure the device or elements therein such as a processor, to perform the functions of corresponding steps illustrated in a method, e.g., steps of the method of flowchart 1000 of FIG. 10, flowchart 600 of FIG. 6 and/or flowchart 700 of FIG. 7.

In some embodiments some of the components of assembly of components 1100 are included in an access point, e.g., access point 300 of FIG. 3, AP 1 102, AP 2 104, AP 3 106, or AP M 108, of FIG. 1, and some of the components of assembly of components 1100 are included in a network attached computer, e.g., a network server, e.g., network attached computer 400 of FIG. 4 or network attached computer 116 of FIG. 1.

Assembly of components 1100 includes a beacon signal detection component 1104 configured to receive beacon signals from a wireless device, e.g. a first wireless device, e.g., a first beacon tag transmitter device, and a beacon signal measurement component 1105 configured to measure received beacon signals which were received from a wireless device. Beacon signal measurement component includes a received signal strength measurement component 1106 which includes a RSSI value determination component 1107 configured to determine a received signal strength indicator value corresponding to a received beacon signal from a wireless device.

Assembly of components 1100 further includes a wireless device motion determination components 1108 configured to determine from the RSS of received beacon signals if the wireless device is in motion. Component 1108 includes a rate of motion determination component 1110 configured to determine a rate of motion of a wireless device based on received beacon signal RSS information. Component 1110 includes a component 1114 configured to determine the rate of RSS change, e.g., a deviation of RSS corresponding to received beacons from the wireless device corresponding to a predetermined size time interval, e.g., a 1 second time interval. Component 1114 includes a RSSI deviation value determination component 1115. Rate of motion determination component 1110 further includes a component 1116 configured to determine if the rate of RSS change is below a first RSS change threshold, a component 1118 configured to determine that the rate of motion of the wireless device is zero in response to a determination that the rate of RSS change is below the first RSS change threshold, a component 1120 configured to determine if the rate of RSS change is below a second RSS change threshold, said second RSS change threshold being greater than said first RSS change threshold, a component 1122 configured to determine that the rate of motion of the wireless device is a first rate of motion, e.g., a low rate of motion, in response to a determination that the rate of RSS change is below the second RSS change threshold and is not below the first threshold, and a component 1124 configured to determine that the rate of motion of the wireless device is a second rate of motion, e.g., a fast rate of motion, in response to a determination that the rate of RSS change is not below the second RSS change threshold, e.g., is equal to or greater than the second RSS change threshold. Wireless device motion determination component 1108 further includes a component 1126 configured to determine if the determined rate of motion of the wireless device is zero, a component configured to determine that the wireless device in not moving 1128 and a component 1130 configured to determine that the wireless device is moving, e.g., the wireless device is moving at either a slow rate or a fast rate.

Figure 16:
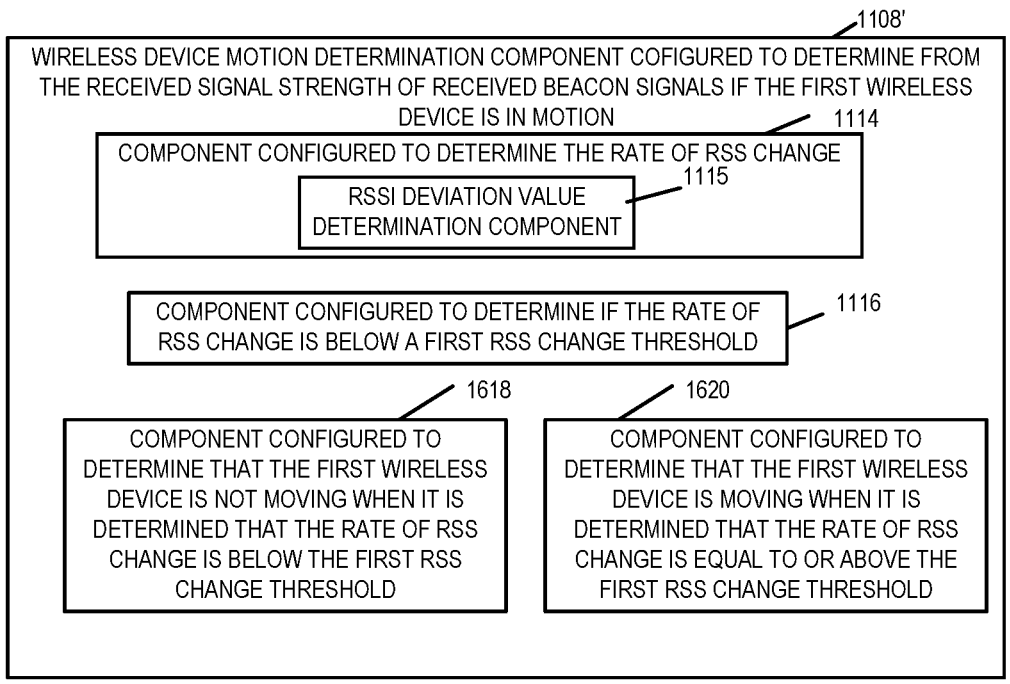
FIG. 16 shows an assembly of components which can be used as an alternative to some of the components shown in FIG. 11.

FIG. 16 shows an alternative set of components 1108' which can be used in place of components 1108 shown in FIG. 11, when simplified step 1008' is implemented rather than step 1008. In FIG. 16 elements which are numbered the same as in FIG. 11 are the same or similar elements and will not be described again. Note that in FIG. 16 because the determination being used is simply whether or not the device is in motion the assembly 1108' includes components 1618 and 1620. Component 1618 is configured to determine that the first wireless device is not moving, e.g., not in motion, when it is determined that the rate of RSS change is below the first RSS change threshold. Component 1620 is configured to determine that the first wireless device is moving when it is determined that eh rate of RSS change is equal to or above the first RSS change threshold.

Referring once again to FIG. 11, assembly of components 1100 further includes a component 1134 configured to determine a processing window used to control processing of received signal strength based on whether the wireless device is determined to be in motion or not in motion and further based on the level of motion. Component 1134 includes a component 1138 configured to determine to use a first processing window having a first duration when the rate of motion of the wireless device is determined to be a zero rate, said first duration being a longer duration than a duration used when the rate of motion is determined to be a non-zero rate, a component 1142 configured to determine to use a second processing window having a second duration when the rate of motion of the wireless device is determined to be the first (slow or low) rate of motion, said second processing window having a shorter duration than said first processing window, and a component 1146 configured to determine to use a third processing window having a third duration when the rate of motion of the wireless device is determined to be the second (fast or high) rate of motion, said third processing window having a shorter duration than said second processing window.

Assembly of components 1100 further includes a component 1149 configured to set the processing window to the processing window which has been determined to be used, e.g., one of the first processing window, second processing window, or third processing window, and a component 1151 configured to communicate the processing which has been determined to be used, e.g., one of the first processing window, second processing window, or third processing window, to another device, e.g., a computer server including a location engine used to determine the location of the wireless device based on processing RSS information obtained from beacon signals.

Assembly of components 1100 further includes a component 1154 configured to make a machine learning update decision based on the determined rate of motion of the wireless device, e.g., based on RSS information. Component 1154 includes a component 1156 configured to determine if the rate of motion of the wireless device is below a first motion rate threshold. In some embodiments, the first motion rate threshold, e.g., a 0 rate of motion or a very low rate of motion. Component 1154 further includes a component 1158 configured to make a decision to perform a machine learning update in response to a determination that the rate of motion of the wireless device is below the first motion rate threshold, and a component 1160 configured to make a decision refrain from performing a machine learning update in response to a determination that the rate of motion of the wireless device is not below the first motion rate threshold. Assembly of components 1100 further includes a machine learning update component 1155 for performing a machine learning update when said machine learning update decision is a decision to perform a machine learning update. Machine learning update component 1163 includes a component 1164 configured to update a path loss parameter based on received signal strength information regarding beacon signals received during said processing window in response to a decision to make a machine learning update based on the determined rate of motion.

Assembly of components 1100 further includes a location engine 1165 configured to determine the location of a wireless device based on received signals, e.g., received beacon signals. Location engine 1165 includes a component 1166 configured to estimate the location of the wireless device based on the strength of received signals received during said determined processing window. Component 1166 includes a component 1168 configured to time average the received signal strength of beacon signals received from the wireless device during the determined processing window. Assembly of components 1100 further includes a component 1172 configured to communicate, e.g., when the wireless device is determined to be not moving, the estimated location of the wireless device to a mobile or fixed terminal, configured to indicate the location of the wireless termination to a user of the mobile of fixed terminal.

Figure 12:
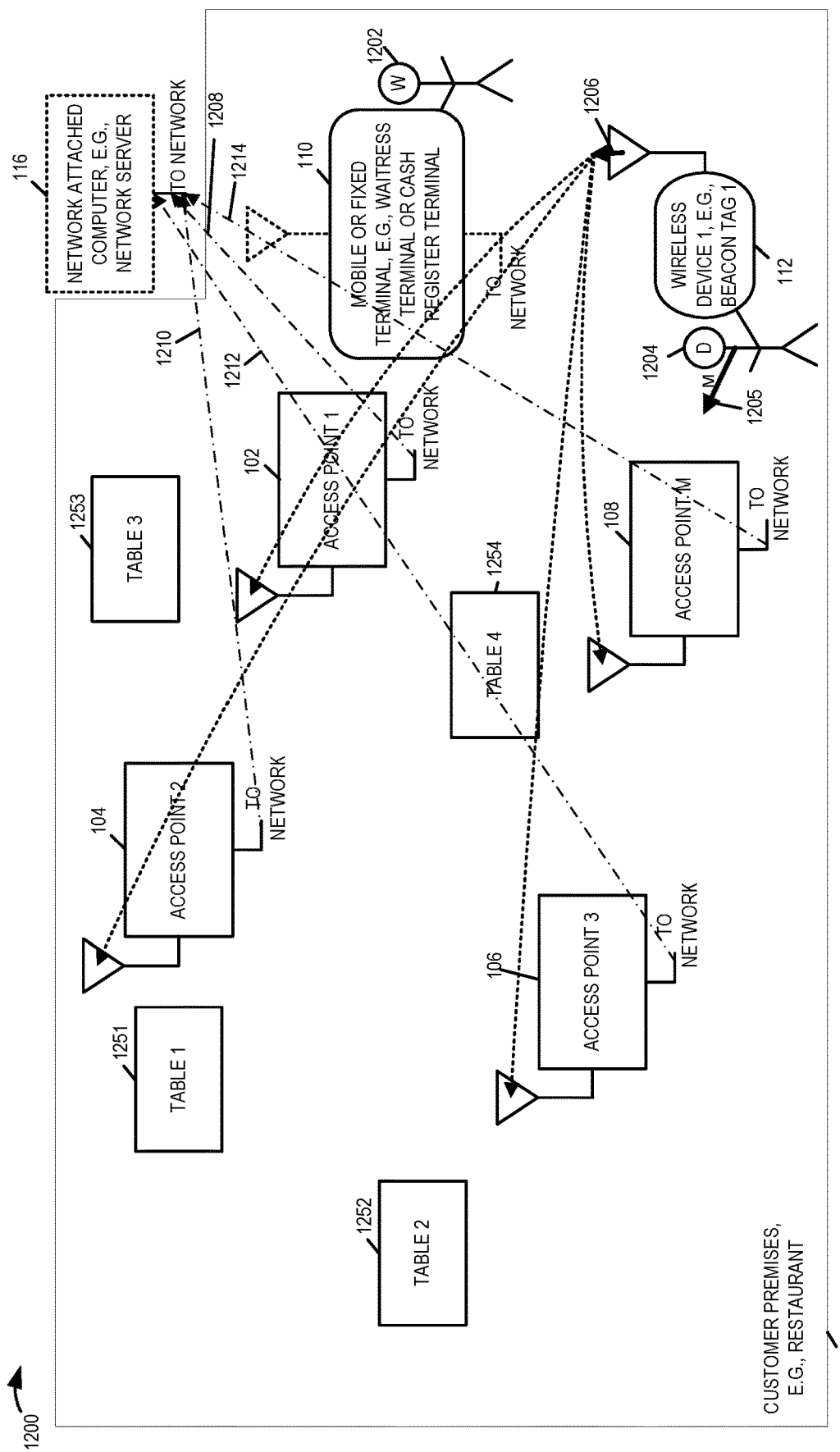
FIG. 12 illustrates a diner with a wireless device, e.g., a beacon transmitter, moving through a restaurant and further illustrates that determined wireless device location information, derived from RSS information corresponding to detected beacon signals, is intentionally not transmitted to a mobile terminal of a waitress while the wireless device is determined to be in motion.
Figure 13:
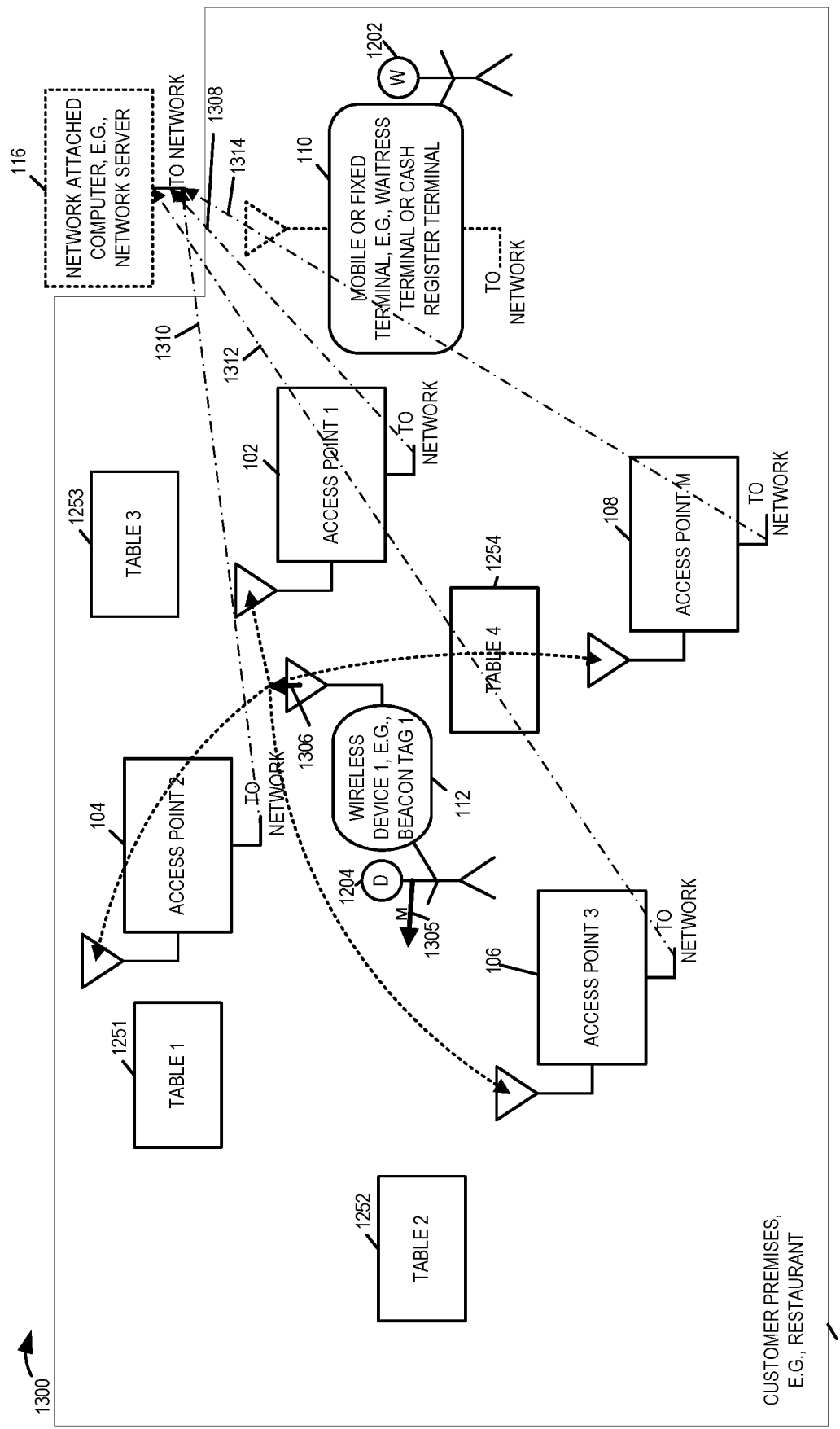
FIG. 13 illustrates the diner with the wireless device, e.g., a beacon transmitter, still moving through the restaurant and further illustrates that determined wireless device location information, derived from RSS information corresponding to detected beacon signals, is intentionally not transmitted to the mobile terminal of the waitress while the wireless device is determined to be in motion.
Figure 14:
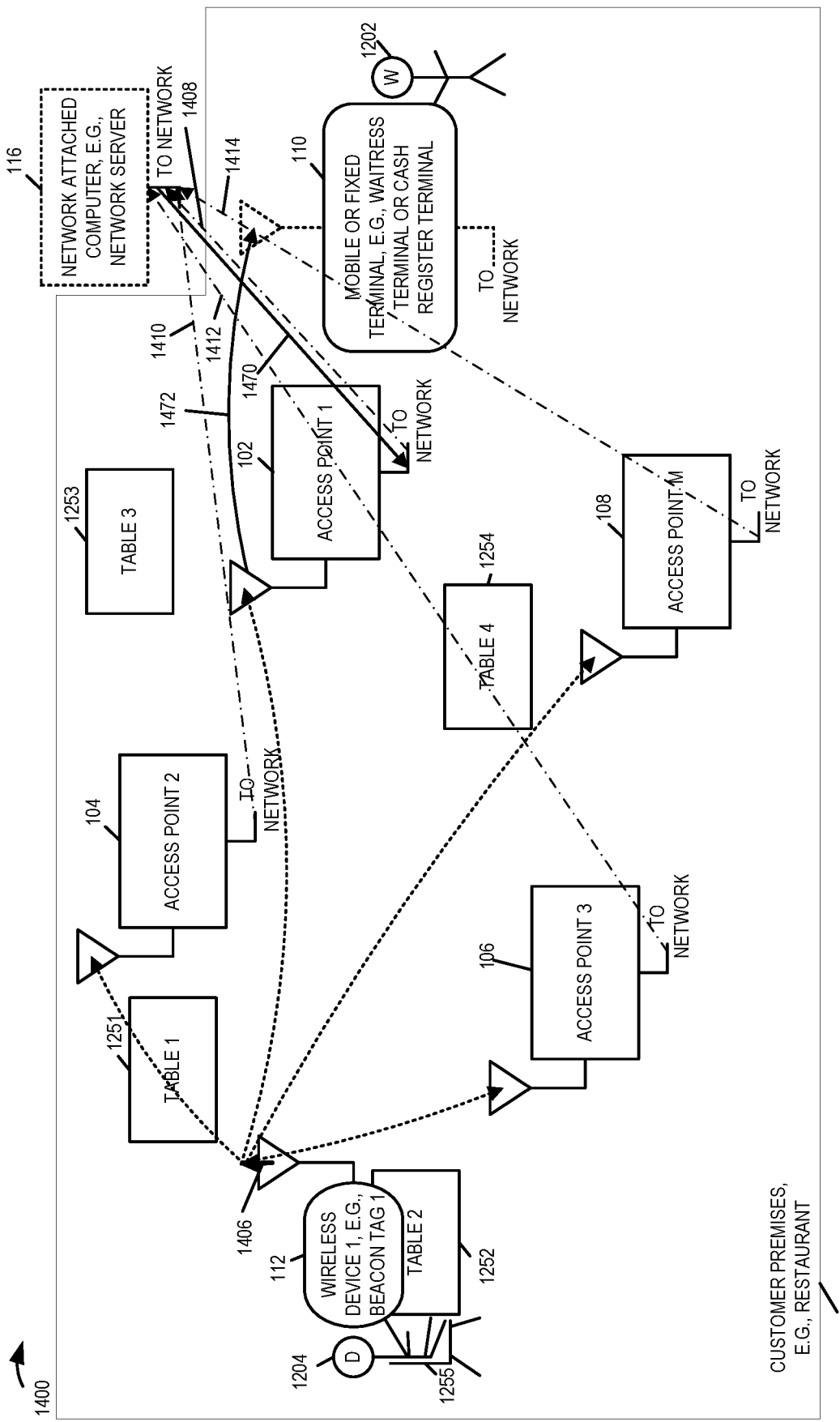
FIG. 14 illustrates the diner with the wireless device, e.g., a beacon transmitter, has arrived at a diner selected table in the restaurant, is seated and the wireless device is stationary and further illustrates that determined wireless device location information, derived from RSS information corresponding to detected beacon signals, is intentionally transmitted to the mobile terminal of the waitress since the wireless device is determined to be stationary.

FIGS. 12, 13 and 14 are a sequence of drawings 1200, 1300, and 1400 used to illustrate features of various embodiments. Drawing 1200 of FIG. 12 illustrates a customer premises 1201, e.g. a restaurant, including the access points (API 1 102, AP 2 104, AP 3 106, AP M 108), wireless device 1 112, e.g., beacon tag 1, and mobile of fixed terminal 110, e.g., a waitress terminal or cash register terminal of system 100 of FIG. 1. Customer premises 1201 further includes four exemplary tables (table 1 1251, table 2 1252, table 3 1253 and table 4 1254). Drawing 1200 further includes network attached computer 116, e.g., a network server, which is located outside the customer premises 1210. Network attached computer 116 is coupled to the APs (102, 104, 106, 108) via a backhaul network. The network attached computer 116 may be, and sometimes is, coupled to the mobile or fixed terminal 110, via wired and/or wireless links.

In FIGS. 12-14, terminal 110, e.g., a mobile terminal, is used by waitress 1202. In FIGS. 12-14, wireless device 1 12, e.g., beacon tag 1, is used by diner 1204, while in the restaurant. Diner 1204 carries wireless device 1 112 as the diner moves through the restaurant, chooses a table, and then sits down at the selected table.

In FIG. 12 diner 1204 is moving through the restaurant as indicated by arrow 1205 with label M. Wireless device 1 112 is transmitting beacon signals 1206. The beacon signals are received by the APs (102, 104, 106, 108) as indicated by the dotted line arrows extending from the antenna on wireless device 112 to the antennas on APs (102, 104, 106, 108). Each AP (102, 104, 106, 108) measures the RSS of the received beacon signals from wireless device 1 112. Each AP (102, 104, 106, 108) reports RSS measurement information and/or information derived from RSS measurements, e.g., RSS deviation information, wireless device rate of motion information, determined processing window information, etc., to the network attached computer 116, via message signals (1208, 1210, 1212, 1214), respectively. The network attached computer 116, which includes a location engine, determines the location of wireless device 1 112. In the example, of FIG. 12, wireless device 1 112 is moving, and the network attached computer is aware that wireless device 1 112 is moving, e.g., based on information derived from RSS measurements of received beacon signals. In accordance with a feature of various embodiments, the network attached computer 116 refrains from sending the determined wireless device 1 location information to terminal 110 while the wireless device 1 112 is moving.

In FIG. 13 diner 1204 is still moving through the restaurant as indicated by arrow 1305 with label M. Wireless device 1 112 is transmitting beacon signals 1306. The beacon signals are received by the APs (102, 104, 106, 108) as indicated by the dotted line arrows extending from the antenna on wireless device 112 to the antennas on APs (102, 104, 106, 108). Each AP (102, 104, 106, 108) measures the RSS of the received beacon signals from wireless device 1 112. Each AP (102, 104, 106, 108) reports RSS measurement information and/or information derived from RSS measurements, e.g., RSS deviation information, wireless device rate of motion information, determined processing window information, etc., to the network attached computer 116, via message signals (1308, 1310, 1312, 1314), respectively. The network attached computer 116, which includes the location engine, determines the location of wireless device 1 112. In the example, of FIG. 13, wireless device 1 112 is moving, and the network attached computer is aware that wireless device 1 112 is moving, e.g., based on information derived from RSS measurements of received beacon signals. In accordance with a feature of various embodiments, the network attached computer 116 refrains from sending the determined wireless device 1 location information to terminal 110 while the wireless device 1 112 is moving.

In FIG. 14 diner 1204 has arrived at table 2 1252 and is stationary and sitting in chair 1255 at table 2 1252. Wireless device 1 112 is motionless on the top of table 2 1252 Wireless device 1 112 is transmitting beacon signals 1406. The beacon signals are received by the APs (102, 104, 106, 108) as indicated by the dotted line arrows extending from the antenna on wireless device 112 to the antennas on APs (102, 104, 106, 108). Each AP (102, 104, 106, 108) measures the RSS of the received beacon signals from wireless device 1 112. Each AP (102, 104, 106, 108) reports RSS measurement information and/or information derived from RSS measurements, e.g., RSS deviation information, wireless device rate of motion information, determined processing window information, etc., to the network attached computer 116, via message signals (1408, 1410, 1412, 1414), respectively. The network attached computer 116, which includes the location engine, determines the location of wireless device 1 112 to be the location of table 2 1252. In some embodiments, the location is determined to be a particular seat or place setting location at table 2 1252. In the example, of FIG. 14, wireless device 1 112 is not moving, and the network attached computer is aware that wireless device 1 112 is not moving, e.g., based on information derived from RSS measurements of received beacon signals. In accordance with a feature of various embodiments, the network attached computer 116 sends the determined wireless device 1 location information to terminal 110 since the wireless device 1 112 is not moving, e.g., the diner has arrived at the diner's selected seating location and the diner is ready to be served.

Network attached computer 116 generates and sends a message to mobile terminal 110 which is being used by waitress 1202, said message communicating the determined location of wireless device 1 112, which is now stationary. The generated message communicating the location of wireless device 1112 is sent from network attached computer to access point 1 102 via the backhaul, as indicated by solid line arrow 1470, and is then sent from the access point 1 102 to mobile terminal 110, via a wireless link, as indicated by solid line arrow 1472. Mobile terminal 110 recovers the message and communicates the location of wireless device 1 112, which should also be the location of diner 1204, to waitress 1202, e.g., via the display of terminal 110. The waitress 1202 is now aware of the location of diner 1204 and is aware that the diner has taken his place at a table.

NUMBERED LIST OF EXEMPLARY METHOD EMBODIMENTS

Method Embodiment 1 A method of using received signals, the method comprising: receiving (1004), performed by a receiver in an access point, beacon signals from a first wireless device; measuring (1006) the received signal strength of the received beacon signals; determining (1008 or 1008') from the received signal strength of the received beacon signals if the first wireless device is in motion; and determining (1034) a processing window (e.g., use short window for time averaging if in motion and use a longer window for time averaging if not in motion since signal strength should be stable if in motion) used to control processing (motion estimation processing window) of received signal strength based on whether the first wireless device is determined to be in motion or not in motion (if it is in motion you want a short processing window which will result in less averaging and a more temporal value).

Method Embodiment 2 The method of Method Embodiment 1, wherein measuring (1006) a received signal strength of a received beacon signal includes determining a received signal strength indicator value.

Method Embodiment 3 The method of Method Embodiment 1, wherein determining (1008 or 1008') from the received signal strength of the received beacon signals if the first wireless device is in motion includes: determining (1014) a rate of motion; and wherein the first wireless device is determined not to be moving (1028) when the determined rate of motion is zero.

Method Embodiment 4 The method of method embodiment 1, wherein determining (1008') from the received signal strength of the received beacon signals if the first wireless device is in motion includes determining (1528) that the first wireless device is not in motion when the rate of RSS change is below a first RSS change threshold (noise threshold a low threshold which might be expected for a static device e.g., due to noise and/or normal changes in the environment).

Method Embodiment 5 The method of method embodiment 4, wherein determining (1008') from the received signal strength of the received beacon signals if the first wireless device is in motion includes determining (1530) that the first wireless device is in motion when the rate of RSS change is equal to or above the first RSS change threshold (noise threshold a low threshold which might be expected for a static device e.g., due to noise and/or normal changes in the environment).

Method Embodiment 6 The method of method embodiment 5, wherein determining (1034) a processing window includes: determining (1038) to use a first processing window having a first duration when the first wireless device is determined to not be in motion; and determining (1042) to use a second processing window having a second duration when the first wireless device is determined to be moving, the second duration being a shorter duration than the first duration of said first processing window.

Method Embodiment 7 The method of Method Embodiment 3, wherein determining (1010) the rate of motion includes: determining (1012) the rate of motion based on a rate at which the received signal strength of the received beacon signals varies with time (e.g., rate of change of RSS).

Method Embodiment 8 The method of Method Embodiment 7, wherein determining (1010) the rate of motion includes determining (1018) a 0 rate of motion (not moving) when the rate of RSS change is below a first RSS change threshold (noise threshold a low threshold which might be expected for a static device e.g., due to noise and/or normal changes in the environment).

Method Embodiment 9 The method of Method Embodiment 8, wherein determining (1010) the rate of motion includes determining (1022) a first rate (slow) of motion when the rate of RSS change is below a second RSS change threshold and above the first RSS change threshold.

Method Embodiment 10 The method of Method Embodiment 9, wherein determining (1010) the rate of motion includes determining (1024) a second (high) rate of motion when the rate of RSS change is above said second RSS change threshold.

Method Embodiment 11 The method of Method Embodiment 9, wherein determining (1034) a processing window includes: determining (1038) to use a first processing window having a first duration when the rate of motion is determined to be zero, said first duration being longer than a duration used when the rate of motion is determined to be a non-zero rate.

Method Embodiment 12 The method of Method Embodiment 11, wherein determining (1034) a processing window includes: determining (1042) to use a second processing window having a second duration when the rate of motion is determined to be said first (low) rate of motion, said second processing window having a shorter duration than said first processing window.

Method Embodiment 13 The method of Method Embodiment 12, wherein determining (1034) a processing window includes: determining (1046) to use a third processing window having a third duration when the rate of motion is determined to be said second (high) rate of motion.

Method Embodiment 14 The method of Method Embodiment 12, wherein said third duration is shorter than said second duration and said second duration is shorter than said first duration.

Method Embodiment 15 The method of Method Embodiment 1, further comprising: making (1054) a machine learning update decision based on the determined rate of motion.

Method Embodiment 16 The method of Method Embodiment 15, wherein making (1054) a machine learning update decision includes: making (1058) a decision to perform a machine learning update when the determined rate of motion is below a first motion rate threshold.

Method Embodiment 17 The method of Method Embodiment 16, wherein making (1054) a machine learning update decision includes deciding (1060) not to perform a machine learning update when the determined rate of motion is above said first motion rate threshold (e.g., device is moving).

Method Embodiment 18 The method of Method Embodiment 15, wherein when said machine learning update decision is a decision to perform a machine learning update, updating (1064) a path loss parameter based on received signal strength information regarding beacon signals received from said first wireless device during said determined processing window.

Method Embodiment 19 The method of Method Embodiment 9, further comprising; estimating (1066) the location of the first wireless device based on the strength of received signals received during said determined processing window.

Method Embodiment 20 The method of Method Embodiment 19, wherein estimating (1066) the location of the first wireless device includes time averaging (1068) the received signal strength of beacon signals received from the first wireless device during said determined processing window (note that the number of samples in the processing window will be larger when there is no or little motion due to a larger determined processing window than when there is a high rate of motion.)

Method Embodiment 21 The method of Method Embodiment 20, further comprising: communicating (1072) the estimated location of the first wireless device to a mobile or fixed terminal configured to indicate the location of the first wireless device to a user of the mobile or fixed terminal (e.g., a waitress terminal or cash register).

Method Embodiment 22 The method of Method Embodiment 21, wherein the first wireless device is a wireless beacon transmitter which does not include a wireless receiver; and wherein communicating the estimated location of the first wireless device to a mobile or fixed terminal is performed only when the first wireless device is determined to be not moving (e.g., when customer has settled at a table where food or other goods are to be delivered).

Numbered List of Exemplary System Embodiments

System Embodiment 1 A system (100) for using received signals, the system comprising: a receiver (303) in an access point (102 or 300) for receiving beacon signals from a first wireless device (112 or 200); a measurement component (1106) for measuring the received signal strength of the received beacon signals; and a processor (304 or 404) configured to: determine from the received signal strength of the received beacon signals if the first wireless device (112 or 200) is in motion; and determine a processing window (e.g., use short window for time averaging if in motion and use a longer window for time averaging if not in motion since signal strength should be stable if in motion) used to control processing (motion estimation processing window) of received signal strength based on whether the first wireless device is determined to be in motion or not in motion (if it is in motion you want a short processing window which will result in less averaging and a more temporal value).

System Embodiment 2 The system (100) of System Embodiment 1, wherein said processor (304 or 404) is located in a node (102 or 300 or 116 or 400) which performs location determination operations.

System Embodiment 3 The system (100) of System Embodiment 2, wherein said node (102 or 300 or 116 or 400) which performs location determination operations is one of an access point (102 or 300) or a network node (116 or 400).

System Embodiment 4 The system (100) of System Embodiment 4, wherein said access point (102 or 300) is located at a customer premises (1201); and wherein said network node (116 or 400) is located at a location outside said customer premises (1201).

System Embodiment 5 The system (100) of System Embodiment 1, wherein said measuring component (1106) is configured to determine a received signal strength indicator value, as part of measuring a received signal strength of a received beacon signal.

System Embodiment 6 The system (100) of System Embodiment 1, wherein said processor (304 or 404) is configured to determine a rate of motion, as part of being configured to determine from the received signal strength of the received beacon signals if the first wireless device is in motion; and wherein the first wireless device is determined not to be moving when the determined rate of motion is zero.

System Embodiment 7 The system (100) of System Embodiment 1, wherein said processor (304 or 404) is configured to determine that the first wireless device (112 or 200) is not in motion when the rate of RSS change is below a first RSS change threshold (noise threshold a low threshold which might be expected for a static device e.g., due to noise and/or normal changes in the environment), as part of being configured to determine from the received signal strength of the received beacon signals if the first wireless device (112 or 200) is in motion.

System Embodiment 8 The system (100) of System Embodiment 7, wherein said processor (304 or 404) is configured to determine that the first wireless device (112 or 200) is in motion when the rate of RSS change is equal to or above the first RSS change threshold (noise threshold a low threshold which might be expected for a static device e.g., due to noise and/or normal changes in the environment), as part of being configured to determine from the received signal strength of the received beacon signals if the first wireless device is in motion.

System Embodiment 9 The system (100) of System Embodiment 8, wherein said processor (304 or 404) is configured to: determine to use a first processing window having a first duration when the first wireless device (112 or 200) is determined to not be in motion; and determine to use a second processing window having a second duration when the first wireless device (112 or 200) is determined to be moving, the second duration being a shorter duration than the first duration of said first processing window, as part of being configured to determine a processing window.

System Embodiment 10 The system (100) of System Embodiment 1, wherein said processor (304 or 404) is configured to determine the rate of motion based on a rate at which the received signal strength of the received beacon signals varies with time (e.g., rate of change of RSS), as part of being configured to determine the rate of motion.

System Embodiment 11 The system (100) of System Embodiment 10, wherein said processor (304 or 404) is configured determine a 0 rate of motion (not moving) when the rate of RSS change is below a first RSS change threshold (noise threshold a low threshold which might be expected for a static device e.g., due to noise and/or normal changes in the environment), as part of being configured to determine the rate of motion.

System Embodiment 12 The system (100) of System Embodiment 11, wherein said processor (304 or 404) is configured to determine a first rate (slow) of motion when the rate of RSS change is below a second RSS change threshold and above the first RSS change threshold, as part of being configured to determine the rate of motion.

System Embodiment 13 The system (100) of System Embodiment 12, wherein said processor (304 or 404) is configured to determine a second (high) rate of motion when the rate of RSS change is above said second RSS change threshold, as part of being configured to determine the rate of motion.

System Embodiment 14 The system (100) of System Embodiment 12, wherein said processor (304 or 404) is configured to determine to use a first processing window having a first duration when the rate of motion is determined to be zero, said first duration being longer than a duration used when the rate of motion is determined to be a non-zero rate, as part of being configured to determine a processing window.

System Embodiment 15 The system (100) of System Embodiment 14, wherein said processor (304 or 404) is configured to determine to use a second processing window having a second duration when the rate of motion is determined to be said first (low) rate of motion, said second processing window having a shorter duration than said first processing window, as part of being configured to determine a processing window.

System Embodiment 16 The system (100) of System Embodiment 15, wherein said processor (304 or 404) is configured to determine to use a third processing window having a third duration when the rate of motion is determined to be said second (high) rate of motion, as part of being configured to determine a processing window.

System Embodiment 17 The system (100) of System Embodiment 15, wherein said third duration is shorter than said second duration and said second duration is shorter than said first duration.

System Embodiment 18 The system (100) of System Embodiment 1, wherein said processor (304 or 404) is further configured to make a machine learning update decision based on the determined rate of motion.

System Embodiment 19 The system (100) of System Embodiment 18, wherein said processor (304 or 404) is configured to make a decision to perform a machine learning update when the determined rate of motion is below a first motion rate threshold, as part of being configured to wherein make a machine learning update decision.

System Embodiment 20 The system (100) of System Embodiment 19, wherein said processor (304 or 404) is configured to decide not to perform a machine learning update when the determined rate of motion is above said first motion rate threshold (e.g., device is moving), as part of being configured to make a machine learning update decision.

System Embodiment 21 The system (100) of System Embodiment 18, wherein said processor (304 or 404) is further configured to update a path loss parameter based on received signal strength information regarding beacon signals received from said first wireless device (112 or 200) during said determined processing window, when said machine learning update decision is a decision to perform a machine learning update.

System Embodiment 22 The system (100) of System Embodiment 12, wherein said processor (304 or 404) is further configured to estimate the location of the first wireless device (112 or 200) based on the strength of received signals received during said determined processing window.

System Embodiment 23 The system (100) of System Embodiment 22, wherein said processor (304 or 404) is further configured to time averaging the received signal strength of beacon signals received from the first wireless device (112 or 200) during said determined processing window (note that the number of samples in the processing window will be larger when there is no or little motion due to a larger determined processing window than when there is a high rate of motion), as part of being configured to estimate the location of the first wireless device (112 or 200).

System Embodiment 24 The system (100) of System Embodiment 23, further comprising: a transmitter (302 or 350 or 450) for communicating the estimated location of the first wireless device (112 or 200) to a mobile or fixed terminal (110 or 500) configured to indicate the location of the first wireless device (112 or 200) to a user of the mobile or fixed terminal (110 or 500) (e.g., a waitress terminal or cash register).

System Embodiment 25 The system (100) of System Embodiment 24, wherein the first wireless device (112 or 200) is a wireless beacon transmitter which does not include a wireless receiver; and wherein communicating the estimated location of the first wireless device (112 or 200) to a mobile or fixed terminal (110 or 500) is performed only when the first wireless device (112 or 200) is determined to be not moving (e.g., when customer has settled at a table where food or other goods are to be delivered).

System Embodiment 20 The system (100) of System Embodiment 7, further comprising: a machine learning update decision component (1154 including 1158 and 1154) for making a machine learning update decision based on the determined rate of motion wherein said machine learning update decision component is configured to: make a decision to perform a machine learning update when the determined rate of motion is below a first motion rate threshold; and make a decision not to perform a machine learning update when the determined rate of motion is above said first motion rate threshold; and a machine learning update component (1163) for performing a machine learning update when said machine learning update decision is a decision to perform a machine learning update.

Numerous embodiments are possible. In accordance with one exemplary embodiment, the specific speed in which the tag is moving is calculated/estimated. It should be noted that due to noise associated with the received RSSI, the speed estimation may suffer from being noisy as well. The specific location and speed may be determined based on information collected by multiple receivers preferentially located in diverse geographical locations. The location determination may be and sometimes is made by a location determination device, sometimes referred to as a location determination engine. The location determination device may be located in an AP or another location, e.g., a network location. In many cases the location determination device is located at a different location than the APs providing the received signal strength information along with information indicating the tag which transmitted the received signal as may be and sometimes is determined from the received beacon signals which are measured by the AP that receives them.

In accordance one embodiment, only a binary determination is made with regard to the rate of motion, e.g., whether the tag is moving or is at rest. For example, for a specific tag, due to noise, the received RSSI at a specific AP may fluctuate between −65, −60, and −55 dbm. The system may be configured that as long as the RSSI fluctuates within +−5 dbm around the mean received RSSI, the system would consider the tag to be static. However when the RSSI varies more than +−5 dbm, the system would determine that the tag is moving. The determination whether the tag is moving can be made either by a single AP or based on signals received by multiple geographically diverse APs. When RSSI signals are used, the calculation may take place at a central AP or in a network attached computer. While a binary rate of motion, 0 or greater, is made in some embodiments in other embodiments different levels or rates of motion are estimated and processing windows having different durations or sample periods are used for the different rates of motion.

As the tag transmits its beacon, the various APs collect and store the corresponding RSSIs and information identify the device which transmitted the received signal. For example an AP measures the RSSI of a signal from a first device over a period of one second and stores it in a buffer, e.g., in a ring buffer used to store RSSI information. The information from the RSSI ring buffer may be and is used by other modules of the system such as a location estimation engine.

As explained above, the RSSI signals may be noisy. When the tag is at rest, it may be beneficial to measure the RSSI over a period of time longer than one second and then average or otherwise process the measurements to reduce the effect of noise. Measuring the RSSI over a longer period of time acts like a low band filter. Therefore increasing the duration over which the RSSI is measured may mitigate fluctuations in the RSSI due to noisy measurements. On the other hand, when the tag is in motion, the RSSIs may vary due to the motion and due to a changing environment, e.g., a new structure such as walls between the tag and the receiver at the AP. In this case, averaging the RSSI over a longer period of time may obfuscate the information about the changing environment and/or the current location.

In accordance with one aspect of some embodiments of the invention, the period of time over which the RSSI is measured and processed for a location determination is adapted based on the speed in which the tag moves.

In accordance with a second aspect of some embodiments of the invention, the RSSI is measured in, e.g., one second intervals and the information is stored in, e.g., a ring buffer. When it is determined that the tag moves fast, the system uses a single RSSI measurement from the buffer. When it is determined that the tag moves slower, the system may use, e.g., 3 consecutive RSSI measurements and average them to produce a single estimation for the RSSI. When it is determined that the tag is at rest, the system may use, e.g., 10 consecutive RSSI measurements and average them to produce a single estimation for the RSSI. Thus the number of received signal measurements used to determine a device's location may and sometimes does vary depending on the rate of motion. While the number of samples used to determine a location may vary based on motion, the time spacing between location determinations can remain the same despite the use of different numbers of samples for the location determination at different times since the buffer includes multiple stored received signal strength measurements that are available for use a given time. While the rate of location determinations can be constant in some embodiments in other embodiment the rate, e.g., frequency, of location determinations is varied based on the rate of motion. In such embodiments not only is the number of signal measurements used varied as the rate of motion is changed, e.g., with more signal measurements being used for a location determination when a device is static or slowly moving but also the frequency of the location determinations can vary with, e.g., fewer location determinations being made for a unit time period than when a device is determined to be moving or moving at a high rate.

In accordance with another aspect of some embodiments of the invention, a binary determination is made whether the tag is at rest or is moving. For a tag at rest the RSSI measure may use a fixed window of, e.g., 10 seconds, whereas for a tag which is determined to be in motion the RSSI measure may use a fixed window of, e.g., one second.

The resulting RSSI (which its measurement time window was adapted based on the estimated speed of the tag) may then be used as an input to the location engine.

This disclosure describes a specific use-case for utilizing the binary determination whether a tag is resting or in motion. Fast food restaurants may allow a customer to order food and then sit at a table while the food is being prepared. In some embodiments, information about the motion of a device, e.g., a simple beacon tag, is used to not only reliability determine the location of a customer in a restaurant, but also when the location information should be used, e.g., to deploy a waiter.

Motion information in some embodiments is also used to enable/disable a location engine update process which is intended to improve the reliability of parameters or other information used in the location estimation process.

The process of determining the location of a customer based on a simple beacon tag may, and in some embodiments, does, include a machine learning process which can and sometimes is enabled/disabled automatically based on a determination of device motion.

In some embodiments the radio signal from the beacon of the tag is received by multiple access points (APs). Each one of these APs determines the RSSI from the said tag. The RSSIs are fed into a location engine (LE) which utilizes these signals to determine the location of the tag, and more specifically, the location of the table where a customer is sitting. The LE may and sometimes does use machine learning for various aspects of its operation. For example, machine learning (ML) may be used to fine tune the parameters of the path loss function (PLF) used to determine the distance of the beacon tag from each one of the APs. In accordance with another aspect of some embodiments of the invention, ML may be used as a classifier to determine, based on the signature of the RSSIs measured by the various APs, at which table the customer is sitting.

In some embodiments machine learning is disabled with respect to RSS information received from a device that is in motion. Once the device is determined to no longer be in motion and its location has been determined, the signal information corresponding to the device is used to retrain and/or update parameters used by the location determination engine to make location determinations. In this way signal measurements corresponding to static device having locations which are determined to be reliably known can be used to update the location determination while less reliable information corresponding to devices in motion will not be used for updating the location engine.

In some embodiments a simple RF tag which has a simple beacon transmitter and not a receiver is provided to restaurant customers. Using the system in accordance with some embodiments of the present invention, the system determines whether the tag is resting or is in motion. In other words, the system may determine whether the restaurant customer is walking in search of a table or whether the customer has already found a table and is sitting, awaiting his food to be delivered.

If the system determines that the customer is still wandering about, it halts the machine learning (adaptation) of the location engine until the customer is stationary, e.g., sits down. This is done to prevent the ML from modifying its parameters while the RSSI may be changing because of the changing radio path between the beacon tag and each one of the APs, e.g., a new structure such as a wall between the tag and the receiver at the AP.

Once the customer becomes stationary the location engine determines the customer location, e.g., which table having a known table location, is the most likely table where the customer is sitting. The location is then communicated to the delivery staff so that the customer's order can be taken to the determined customer location, e.g., table. By waiting until it is determined that the user is no longer moving, delivery is not initiated before the customer has made his/her final table location as indicated by the location of the beacon transmitted becoming stationary with a location corresponding to a known table location.

Once the customer becomes stationary, e.g., sits down at a table, in some embodiments the ML algorithm of the location engine (LE) updates one or more location determination related parameters, e.g., a path loss function parameter, using the RSSI information corresponding to the customer whose location has become stationary and been determined to correspond to a known table location. In this way, RSS information which corresponds to a location of high probability can be used to update the location model parameters while less reliable information, e.g., signal measurements made while the beacon transmitter was given to a customer was moving, are not used to update the parameters of the location estimate for the restaurant where the customer carrying the beacon transmitter was located. The updated parameters can and in some embodiments are used by a location determination engine to make a location determination based on reported or measured signal strength thereby determining the location of a wireless terminal to which the signal strength measurements correspond.

Numerous additional variations on the above described methods and apparatus are possible.

The techniques of various embodiments may be implemented using software, hardware and/or a combination of software and hardware. Various embodiments are directed to apparatus, e.g., mobile nodes such as BLE tag devices, mobile beacon transmitters, network servers with a location determination engine, mobile wireless terminals, base stations, e.g., access points, communications system. Various embodiments are also directed to methods, e.g., method of controlling and/or operating a communications device, e.g., wireless terminals (UEs), base stations, control nodes and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices and nodes described herein are implemented using one or more modules to perform the steps corresponding to one or more methods, for example, signal generation, transmitting, processing, and/or receiving steps. Thus, in some embodiments various features are implemented using modules. Such modules may be implemented using software, hardware or a combination of software and hardware. In some embodiments each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the steps of one or more methods of the invention.

In some embodiments, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above.

Numerous additional variations on the methods and apparatus of the various embodiments described above will be apparent to those skilled in the art in view of the above description. Such variations are to be considered within the scope. The methods and apparatus may be, and in various embodiments are, used with BLE, LTE, CDMA, orthogonal frequency division multiplexing (OFDM), and/or various other types of communications techniques which may be used to provide wireless communications links between access nodes and mobile nodes. In some embodiments the access nodes are implemented as base stations which establish communications links with user equipment devices, e.g., mobile nodes, using OFDM and/or CDMA. In various embodiments the mobile nodes are implemented as notebook computers, personal data assistants (PDAs), or other portable devices including receiver/transmitter circuits and logic and/or routines, for implementing the methods.

The invention claimed is:

1. A method comprising:
   determining received signal strength indication (RSSI) values of signals from a first wireless device;
   determining a rate of motion of the first wireless device based on a rate at which the RSSI values vary with time;
   conditionally updating a machine learning model based on the determined rate of motion; and
   deriving path loss parameters from the machine learning model; and
   estimating a location of the first wireless device based on the derived path loss parameters.

2. The method of claim 1, wherein the rate of motion is determined to be nonzero when a rate at which the RSSI values vary transgresses a predefined first threshold.

3. The method of claim 2, wherein the determining of the rate of motion includes determining a first rate of motion when the rate at which the RSSI values vary is above the predefined first threshold and below a predefined second threshold.

4. The method of claim 3, wherein the determining of the rate of motion includes determining a second rate of motion when the rate at which the RSSI values vary is above said second threshold.

5. The method of claim 1, wherein the conditional updating of the machine learning model comprises updating the machine learning model in response to the determined rate of motion being below a first motion rate threshold.

6. The method of claim 5, wherein the conditional updating of the machine learning model further comprises inhibiting an update to the machine learning model in response to a second determined rate of motion being above said first motion rate threshold.

7. The method of claim 1, further comprising determining a frequency of location estimates of the first wireless device based on the rate of motion, wherein the estimation of the location of the first wireless device is based on the frequency of location estimates.

8. The method of claim 7, wherein the determination of the frequency is based on whether the rate of motion is above a predefined threshold.

9. The method of claim 8, further comprising: determining a first location estimate of the first wireless device based on a first number of RSSI measurements when a first rate of motion is below the predefined threshold and determining a second location estimate of the first wireless device based on a second number of RSSI measurements when a second rate of motion is above the predefined threshold.

10. A system comprising:
hardware processing circuitry;
one or more hardware memories storing instructions that when executed configure the hardware processing circuitry to perform operations comprising:
determining received signal strength indication (RSSI) values of signals from a first wireless device;
determining a rate of motion of the first wireless device based on a rate at which the RSSI values vary with time;
conditionally updating a machine learning model based on the determined rate of motion;
deriving path loss parameters from the machine learning model; and
estimating a location of the first wireless device based on the derived path loss parameters.

11. The system of claim 10, wherein the rate of motion is determined to be nonzero when a rate at which the RSSI values vary transgresses a predefined first threshold.

12. The system of claim 11, wherein the determining of the rate of motion includes determining a first rate of motion when the rate at which the RSSI values vary is above the predefined first threshold and below a predefined second threshold.

13. The system of claim 12, wherein the determining of the rate of motion includes determining a second rate of motion when the rate at which the RSSI values vary is above said second threshold.

14. The system of claim 10, wherein the conditional updating of the machine learning model comprises updating the machine learning model in response to the determined rate of motion being below a first motion rate threshold.

15. The system of claim 14, wherein the conditional updating of the machine learning model further comprises inhibiting an update to the machine learning model in response to a second determined rate of motion being above said first motion rate threshold.

16. The system of claim 10, the operations further comprising determining a frequency of location estimates of the first wireless device based on the rate of motion, wherein the estimation of the location of the first wireless device is based on the frequency of location estimates.

17. The system of claim 16, wherein the determination of the frequency is based on whether the rate of motion is above a predefined threshold.

18. The system of claim 17, the operations further comprising: determining a first location estimate of the first wireless device based on a first number of RSSI measurements when a first rate of motion is below the predefined threshold and determining a second location estimate of the first wireless device based on a second number of RSSI measurements when a second rate of motion is above the predefined threshold.

19. A non-transitory computer readable storage medium comprising instructions that when executed configure hardware processing circuitry to perform operations comprising:
determining received signal strength indication (RSSI) values of signals from a first wireless device;
determining a rate of motion of the first wireless device based on a rate at which the RSSI values vary with time;
conditionally updating a machine learning model based on the determined rate of motion;
deriving path loss parameters from the machine learning model; and
estimating a location of the first wireless device based on the derived path loss parameters.

20. The non-transitory computer readable storage medium of claim 19, the operations further comprising determining a frequency of location estimates of the first wireless device based on the rate of motion, wherein the estimation of the location of the first wireless device is based on the frequency of location estimates.

* * * * *